(12) United States Patent
Muhassin et al.

(10) Patent No.: US 11,812,128 B2
(45) Date of Patent: Nov. 7, 2023

(54) METHODS AND SYSTEMS FOR DETERMINATION OF BORESIGHT ERROR IN AN OPTICAL SYSTEM

(71) Applicant: Motional AD LLC, Boston, MA (US)

(72) Inventors: Nijumudheen Muhassin, Pittsburgh, PA (US); Jayesh Dwivedi, Pittsburgh, PA (US); Yew Kwang Low, Singapore (SG)

(73) Assignee: MOTIONAL AD LLC, Boston, MA (US)

( * ) Notice: Subject to any disclaimer, the term of this patent is extended or adjusted under 35 U.S.C. 154(b) by 55 days.

(21) Appl. No.: 17/581,582

(22) Filed: Jan. 21, 2022

(65) Prior Publication Data

US 2023/0262303 A1 Aug. 17, 2023

(51) Int. Cl.
*H04N 5/335* (2011.01)
*H04N 23/54* (2023.01)
*H04N 23/51* (2023.01)
*H04N 23/55* (2023.01)

(52) U.S. Cl.
CPC ............. *H04N 23/54* (2023.01); *H04N 23/51* (2023.01); *H04N 23/55* (2023.01)

(58) Field of Classification Search
CPC ...................................................... H04N 23/51
See application file for complete search history.

(56) References Cited

U.S. PATENT DOCUMENTS

| 7,423,673 | B1 | 9/2008 | Efrat et al. |
| 9,734,419 | B1 | 8/2017 | Ye et al. |
| 2017/0070725 | A1* | 3/2017 | Kishiwada ............... G06T 7/85 |
| 2019/0082173 | A1 | 3/2019 | Schilling |
| 2019/0212636 | A1* | 7/2019 | Stein ..................... G03B 17/02 |

FOREIGN PATENT DOCUMENTS

| JP | 2017-062198 A | 3/2017 |
| WO | WO 2015/133414 A1 | 9/2015 |
| WO | WO 2022/014215 A1 | 1/2022 |
| WO | WO-2022014215 A1 * | 1/2022 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2203254.4, dated Sep. 5, 2022.

* cited by examiner

*Primary Examiner* — Gary C Vieaux
(74) *Attorney, Agent, or Firm* — Knobbe Martens Olson & Bear LLP

(57) ABSTRACT

Provided are methods for determination and correction of boresight shift caused by the installation of an optical layer over a camera assembly. Some methods described include performing a first calibration prior to installation of the window, performing a second calibration after installation of the window, and comparing the first and second calibrations to determine a transformation that corrects for the boresight shift. Systems and computer program products are also provided.

20 Claims, 21 Drawing Sheets

| View Angle | N1 | N2 | tetha 1 | tetha 2 | DOE Surface Angle |
|---|---|---|---|---|---|
| 2 | 1.5158 | 1 | 3.86 | 5.86 | 86.14 |
| 4 | 1.5158 | 1 | 7.65 | 11.65 | 82.35 |
| 6 | 1.5158 | 1 | 11.32 | 17.32 | 78.68 |
| 8 | 1.5158 | 1 | 14.81 | 22.81 | 75.19 |
| 10 | 1.5158 | 1 | 18.08 | 28.08 | 71.92 |
| 12 | 1.5158 | 1 | 21.11 | 33.11 | 68.89 |
| 14 | 1.5158 | 1 | 23.88 | 37.88 | 66.12 |
| 16 | 1.5158 | 1 | 26.39 | 42.39 | 63.61 |
| 18 | 1.5158 | 1 | 28.64 | 46.64 | 61.36 |
| 20 | 1.5158 | 1 | 30.65 | 50.65 | 59.35 |
| 22 | 1.5158 | 1 | 32.43 | 54.43 | 57.57 |
| 24 | 1.5158 | 1 | 33.99 | 57.99 | 56.01 |
| 26 | 1.5158 | 1 | 35.35 | 61.35 | 54.65 |
| 28 | 1.5158 | 1 | 36.53 | 64.54 | 53.47 |
| 30 | 1.5158 | 1 | 37.54 | 67.55 | 52.46 |

FIG. 17

METHODS AND SYSTEMS FOR DETERMINATION OF BORESIGHT ERROR IN AN OPTICAL SYSTEM

BACKGROUND

Covering a camera or other optical assembly with an additional layer, such as a protective layer, can cause a boresight shift. As used herein, the term boresight shift can refer to the misalignment of the camera or other optical assembly's optical axis with a reference axis. Boresight shift can be caused by additional refraction or misalignment caused by the optical properties of the additional layer.

BRIEF DESCRIPTION OF THE FIGURES

FIG. 17 is a diagram showing the shapes of the image of FIG. 15 sorted into an order as part of a process for geometric intrinsic camera calibration using a diffractive optical element;

DETAILED DESCRIPTION

Figure 1:
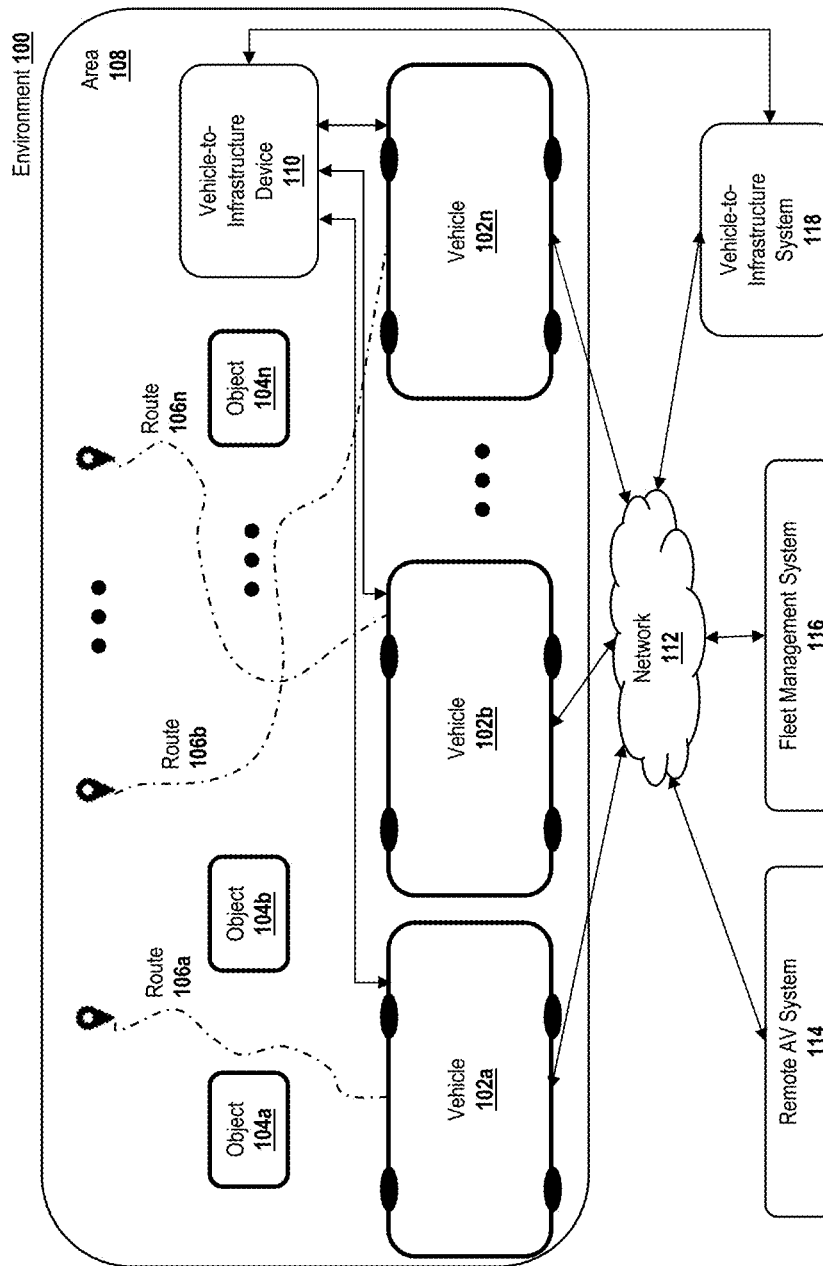
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement determination and/or correction of boresight error in an optical system. For example, installation of a window over a camera assembly causes a boresight shift that misaligns the optical axis of the camera assembly with its mechanical axis, leading to reduced performance of the camera assembly. For various reasons, including both aesthetic design reasons and functional reasons, it may be desirable to install a window over a camera assembly in an autonomous vehicle. A calibration process described in this application can generate a transformation that can be used to compensate or correct for the boresight shift caused by the window. The calibration process comprises determining a first plurality of pixel locations corresponding to a target prior to installation of the window, determining a second plurality of pixel locations corresponding to the target subsequent to installation of the window, and generating a transformation that maps the second plurality of pixel locations to the first plurality of pixel locations. The transformation can then be applied to subsequent images captured by the camera assembly to correct or compensate for the boresight shift caused by the window.

By virtue of the implementation of systems, methods, and computer program products described herein, techniques for determination and/or correction of boresight error in an optical system provide a calibration process that allows for correcting for boresight shift regardless of the optical properties of the window, allowing for a wide variety of window designs to be used without compromising the optical performance of the camera assembly. In some instances, the calibration process reduces the precision with which the windows must be installed relative to the camera assemblies.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
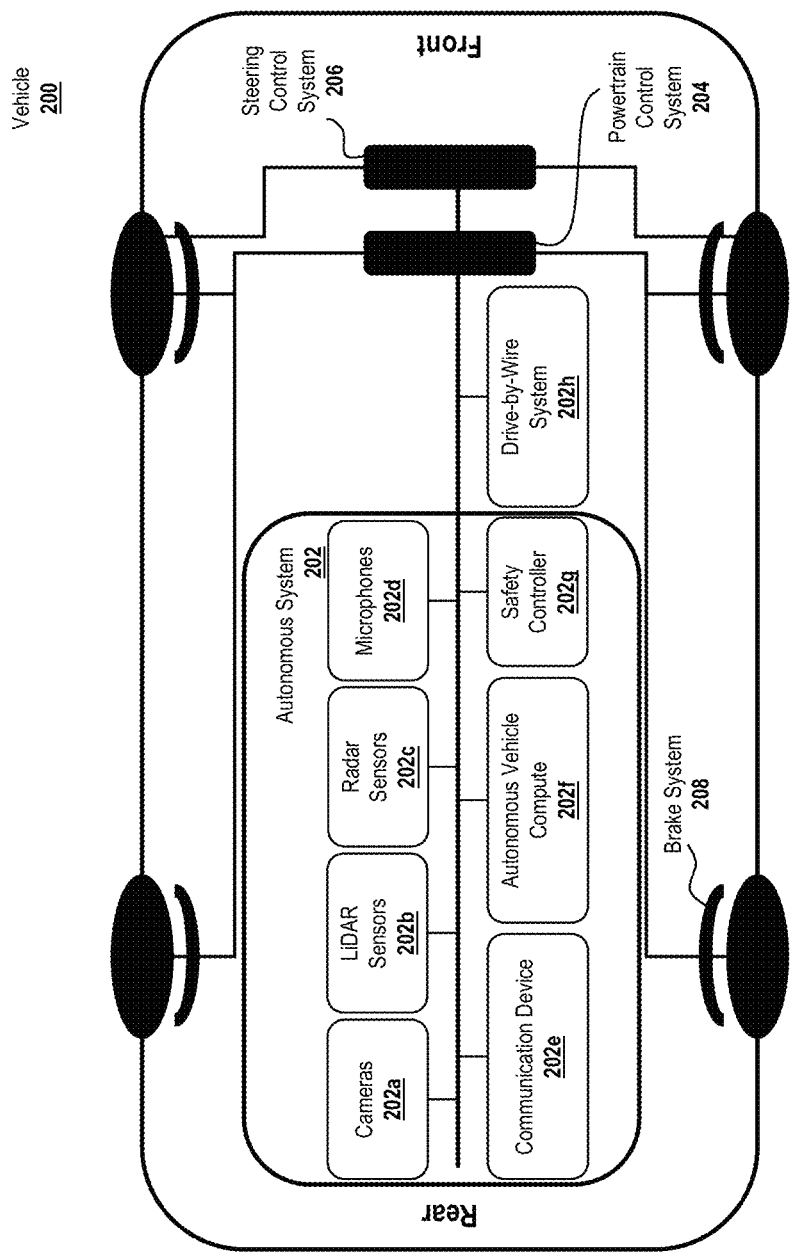
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
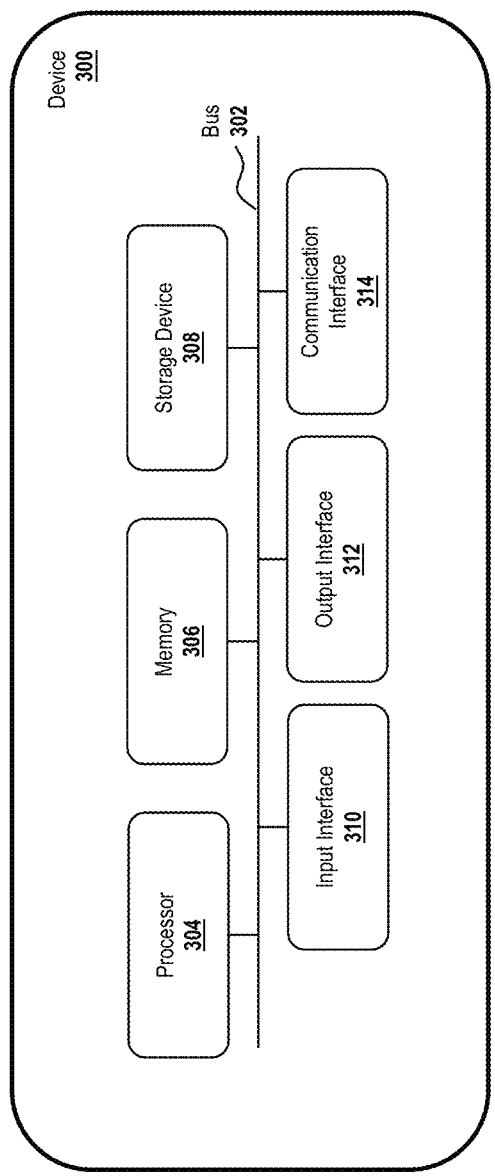
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device vehicles 200, and/or one or more devices of network 112

(e.g., one or more devices of a system of network 112). In some embodiments, one or more devices of vehicles 102 (e.g., one or more devices of a system of vehicles 102), one or more devices of vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
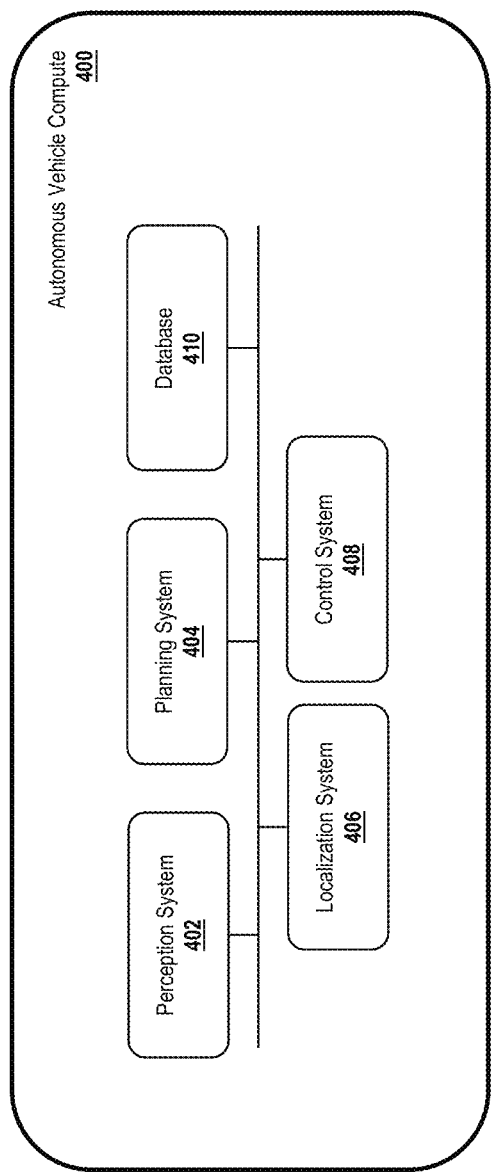
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
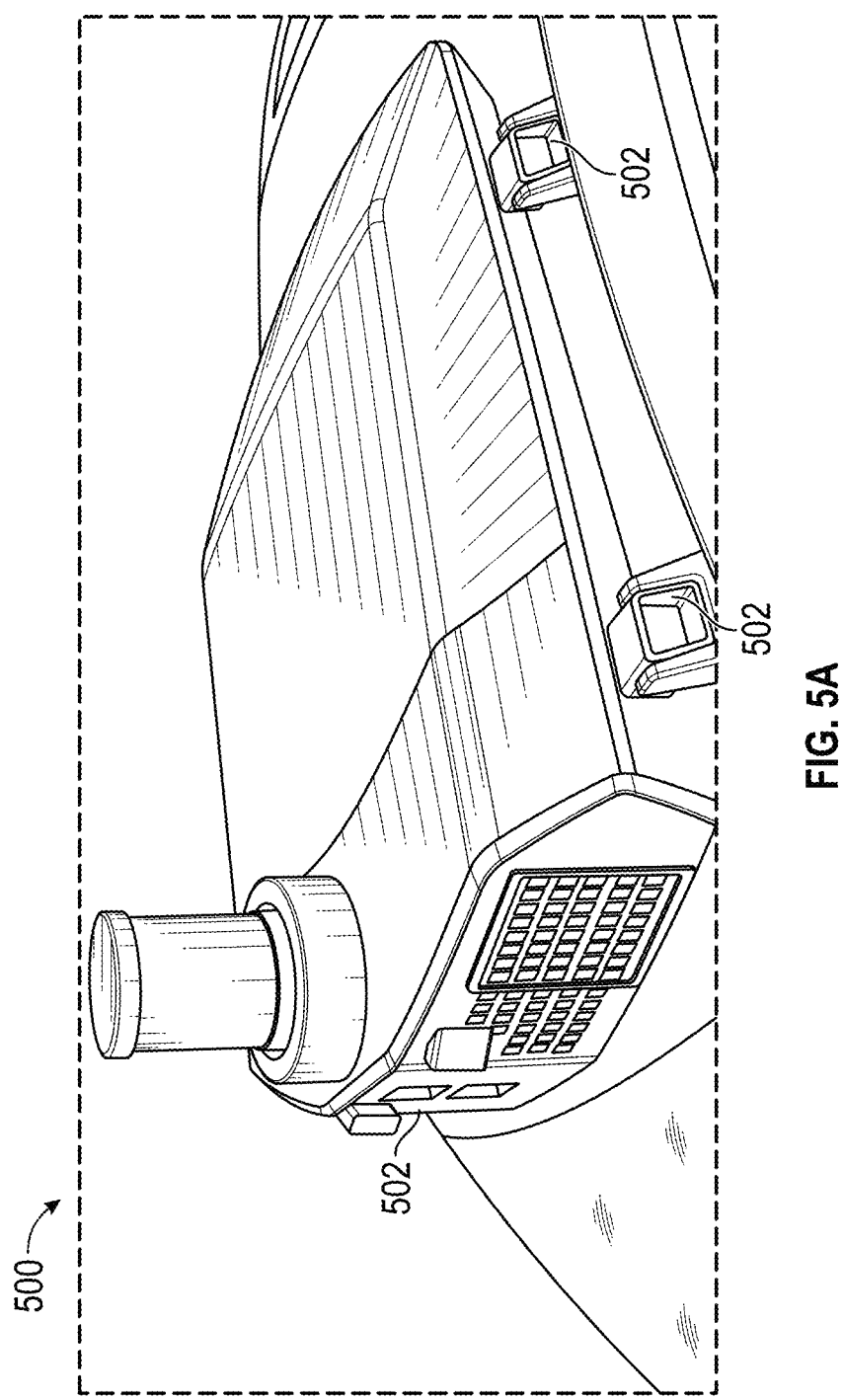
FIG. 5A illustrates an example of an autonomous system of a vehicle including one or more camera or other optical systems over an additional protective layer can be installed.

As described above, autonomous systems, such as those described with respect to FIGS. 1-4, can rely on the input of, among other things, one or more optical or camera systems or assemblies. For example, the autonomous systems 202 of the vehicle 200 includes cameras 202a described above. FIG. 5A illustrates an embodiment of an autonomous system 500 that can be included on a vehicle. As shown in FIG. 5A, the system 500 can include one or more camera or other optical assemblies 502 positioned thereon. The one or more camera or other optical assemblies 502 can include lens and image sensors that gather images that can be used by the autonomous system 500 to facilitate driving of the vehicle.

In some instances, it may be desirable to cover the camera or other optical assemblies 502 with a window. For example, a window can be installed over any of the optical assemblies 502 shown in FIG. 5A, or any other optical assembly. A window may be installed to protect the optical assembly from, for example, impact, dust, water, etc. In some embodiments, the window may be installed for stylistic reasons (e.g., to improve the aesthetics of the vehicle). Additionally or alternatively, the window may improve the functionality of the sensor. For example, the window may provide athermazaliation, moisture mitigation, intrinsic thermal shift testing using thermal chamber, a hydrophobic coating requirements, or other types of functionality. In some embodiments, the window may comprise a clear layer and can be formed from a material such as additional layer of glass, silica, polycarbonate, or other materials.

Installation of a window over the optical sensors 502, however, can cause some problems. For example, installation of a window over an optical sensor can cause a boresight shift. A boresight shift can refer to the misalignment of an optical system's axis relative to with a certain reference optical axis or mechanical axis. For example, when the optical sensors 502 are installed, they are generally installed at a certain position such that the optical axis of the optical sensors 502 are pointed in desirable directions. Installing a window over the optical sensors 502 causes a shift that misaligns the optical sensors 502 with their desirable orientation. In particular, a shift in pixels is caused when an optical layer is added to the camera system due to the added refraction and misalignment caused by this new material. This changes the intrinsic characteristics of the camera system, which if not accounted for, can lead to reduced performance and accuracy for an autonomous system that relies on the optical sensors 502 as an input. Accordingly, it can be beneficial to determine the degree of the boresight shift caused by the new material and correct for it.

This application provides methods and systems for computing and visualizing the boresight aberration in an optical system. As will be discussed in more detail, intrinsic parameters of the optical system with and without the added window are determined and compared to determine the different directions in which the pixels point as caused by the window. In some embodiments, the methodology includes creating a grid of pixel locations covering the calibrated field of view in both cases (e.g., with and without the window installed). For each pixel within the grid, the direction (e.g., the three-dimensional ray direction) of the pixel is determined based on an intrinsic calibration of the camera. The angular error between directions with and without the window installed can then be determined. This angular error represents the boresight shift. In some embodiments, the angular error is determined in arcmins. This error can be represented as a quiver plot. A transformation between the differences can be generated and applied to correct for the boresight shift. In some instances, once this error is calculated, it may not be necessary to align the optical layer or window perfectly. This can be because a transformation can be computed that corrects for errors caused by the alignment of the window. For example, once the rotation and translation matrix is determined, the system is not susceptible to alignment issues. Additionally, the capability to measure and correct for the boresight shift also aids with the usage and selection of a variety of materials irrespective of the materials refractive index or different curvature.

Figure 5B:
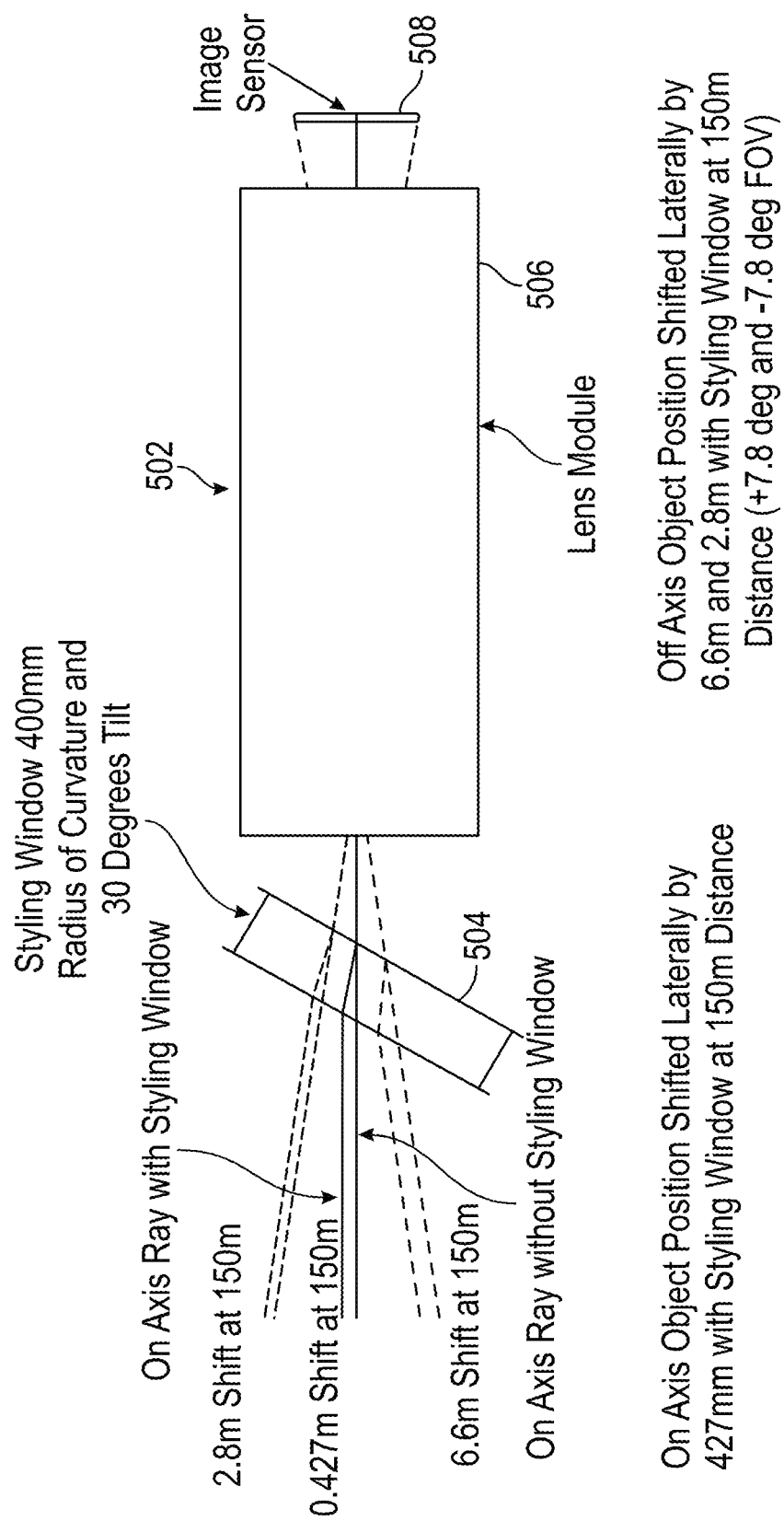
FIG. 5B illustrates an example of boresight shift caused by installation of an additional layer in front of a camera system.

FIG. 5B schematically illustrates an example of boresight shift caused by installation of a window 504 over a camera assembly 502, which comprise a lens module 506 and an image sensor 508. As shown in this example, the window 504 is installed in front of the lends module 508 such that rays of light pass through the window 504 prior to passing through the lens module 506 to ultimately be focused onto the image sensor 508. For comparison, the rays are illustrated both as affected by the window 504 and as if the window 504 was not present. Additionally, rays are illustrated at both an on-axis position (the center rays illustrated in blue) and two off axis positions above (+7.8 degrees FOV) and below (−7.8 degrees FOV) the on-axis position (as illustrated in red (above) and green (below). For each ray, a certain amount of diffraction occurs as the rays pass through the window. For objects appearing at 150 yards, this diffraction can lead to a significant shift in the perceived location of the object. For example, for the on-axis ray, a shift of 0.427 meters occurs. Even more extreme, at the off-axis positions, shifts of 2.8 meters and 6.6 meters occur. While these examples relate to a specific configuration and orientation of the window, the problems associated with boresight shift are illustrated clearly. If not accounted for, objects may appear shifted from their actual location, which can be particularly problematic in autonomous systems that rely on the output of the camera assembly 502 to determine how to guide a vehicle.

Determining the boresight shift and correcting for it can be accomplished by comparing the differences in the intrinsic parameters of the camera system both with and without the window installed. One method for determining the intrinsic parameters of the camera can include the use of a diffractive optical element (DOE). FIGS. 6-17 illustrate examples of a DOE intrinsic calibration module according to one embodiment, as well as associated methods of manufacture and use of the same. As will be described further below, such a DOE intrinsic calibration module can be utilized during a boresight shift determination and correction process.

Figure 6:
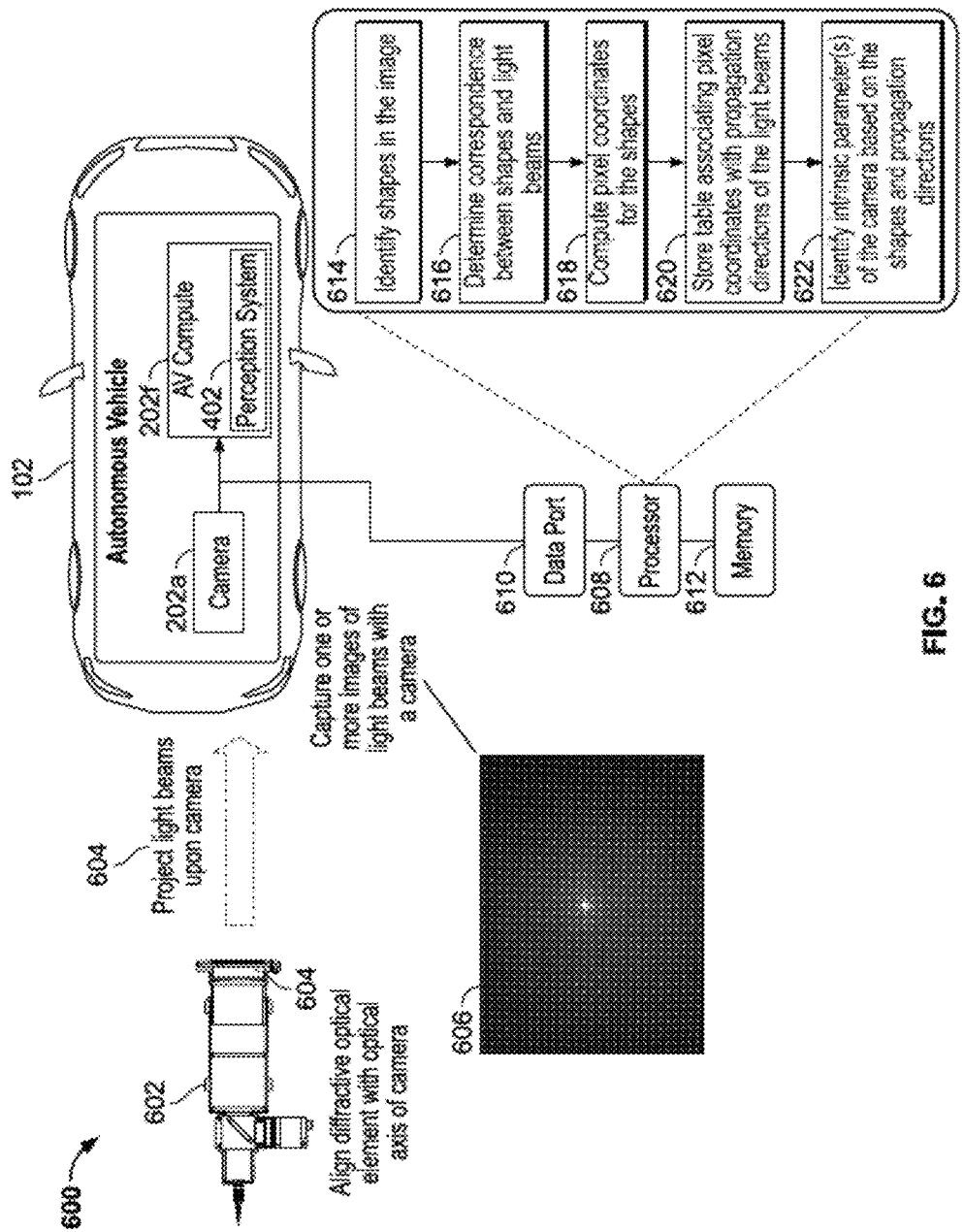
FIG. 6 is a diagram of an implementation of a process for geometric intrinsic camera calibration using a diffractive optical element.

Referring now to FIG. 6, illustrated is a diagram of an implementation of a process 600 for geometric intrinsic camera calibration using a diffractive optical element. In some embodiments, one or more of the steps described with respect to process 600 are performed (e.g., completely, partially, and/or the like) by autonomous vehicle 102, as above. Additionally or alternatively, in some embodiments one or more steps described with respect to process 600 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

As shown in FIG. 6, a device 602 including a diffractive optical element 604 is aligned with an optical axis of a camera 202a (e.g., which may be affixed to autonomous vehicle 102 in some examples). Device 602 projects light beams 604 upon camera 202a via the diffractive optical element 604. Each of light beams 604 has a propagation direction associated with a corresponding view angle from among multiple view angles of camera 202a. Camera 202a captures an image 606 based on light beams 604 and forward the image to one or more processors 608 via data port 610. Processor 608 executes instructions stored in memory 612 to identify (614) shapes in the received image 606, determine (616) a correspondence between the shapes in the image 606 and the light beams 604, compute (618) pixel coordinates for the shapes, store (620) a table associating the pixel coordinates with corresponding propagation directions of the light beams 604, and identify (622) one or more intrinsic parameters of the camera that minimize a reprojection error function based on the shapes in the image 606 and the propagation directions.

Figure 7:
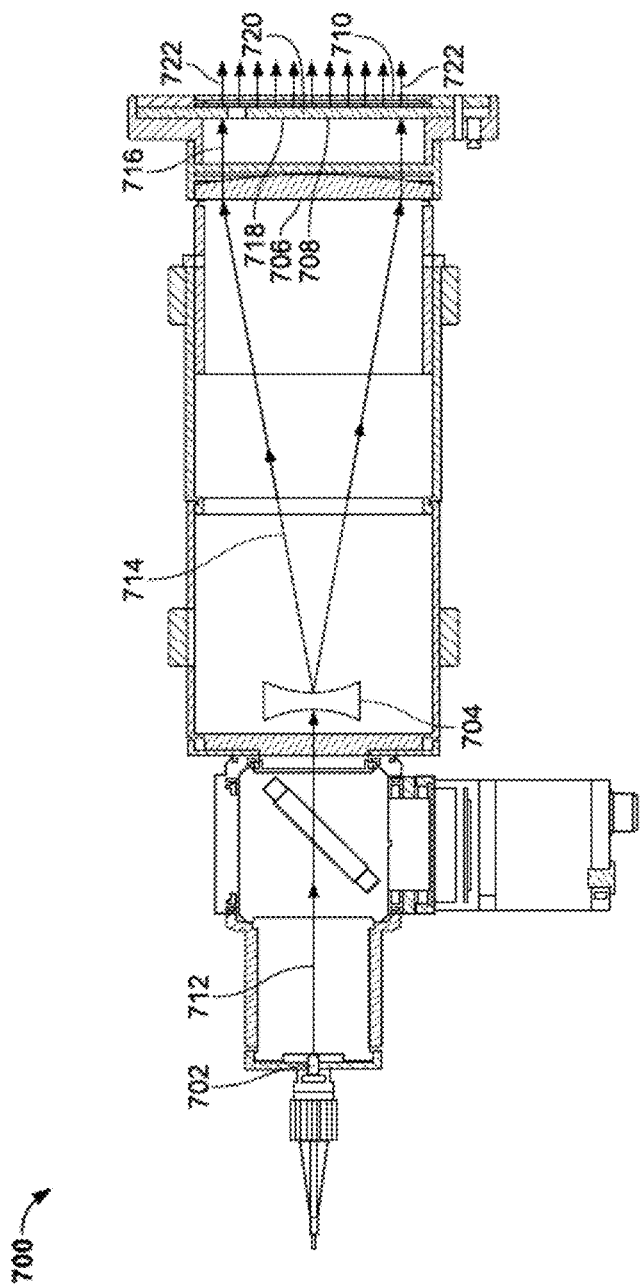
FIG. 7 is a diagram of an implementation of a geometric intrinsic camera calibration system including a diffractive optical element.

Referring now to FIG. 7, illustrated is a diagram of an implementation of a geometric intrinsic camera calibration system 700. In some embodiments, system 700 includes a laser 702 (e.g., a solid-state laser), a beam expanding lens 704, a collimator 706, a diffractive optical element 708 (which, for example, may be the same as, or similar to, one or more diffractive optical element(s) described elsewhere herein), and a protective window 712. Laser 702 is configured to output a first light beam 712 toward collimator 706, optionally by way of beam expanding lens 704. In some examples, beam expanding lens 704 is configured to expand the first light beam 712 into an expanded light beam 714 and provide the expanded light beam to collimator 706. In still other examples, collimator 706 is a beam expanding type of collimator that is configured to expand the first light beam 712 output by the laser 702, thereby causing a diameter of the collimated light beam 716 to be greater than a diameter of the first light beam 712 output by the laser 702. Collimator 706 is arranged along an optical path of laser 702 and is configured to output a collimated light beam 716 based on the first light beam 712 (or the expanded light beam 714, as the case may be) received from laser 702 (and/or beam expanding lens 704).

Diffractive optical element 708 is arranged along an optical path of collimator 706 and includes a first surface 718 and a second surface 720. First surface 718 (e.g., a flat side) includes a mask (not separately shown in FIG. 7) having apertures corresponding to view angles of a camera (e.g., camera 202a, not separately shown in FIG. 7). Second surface 720 includes ridges (not separately shown in FIG. 7) corresponding to the view angles, each ridge having a ridge angle associated with the corresponding view angle. Diffractive optical element 708 is configured to split the collimated light beam 716 into multiple light beams 722 by passing the collimated light beam 716 through apertures (e.g., such as apertures 808 shown in FIG. 8), and output the light beams 722 through the ridges to a lens (not separately shown in FIG. 7) of the camera for calibration, the light beams 722 being output in respective propagation directions based on the ridge angles. In one example, the light beams 722 are configured during a design phase of the DOE 708. In such an example, a grating angle of the DOE 708 is predetermined based on a desired number of light beams (e.g., light beams 722) in which the primary light beam 712 is to be split, for instance, by utilizing equations (1), (2), and (3) in the manner described below. In another example, various aspects of the DOE 708 are configured during a design phase based on a field of view and/or a resolution of a camera that is to be tested utilizing the DOE 708. For instance, for a camera having a field of view of 30 degrees and a resolution of 2 degrees, the DOE 708 may be configured to split a primary light beam (e.g., the same as or similar to light beam 712) into 15 light beams (e.g., the same as or similar to light beams 722) to cover each 2-degree resolution interval from among the 30 degrees of the field of view. A size of a primary light beam (e.g., the same as or similar to light beam 712) and/or a size of the multiple light beams (e.g., the same as or similar to light beams 722) into which the primary light beam is split by the DOE 708, in another aspect, may be defined based on a cross-sectional area of the DOE 708, such as by sizing the apertures (e.g., apertures 808 of FIG. 8) to utilize a maximal amount of cross-sectional area of a side (e.g., side 806 of FIG. 8) of the DOE 708. In some examples, diffractive optical element 708 is further configured to project the light beams 722 through the lens and upon an image sensor of the camera, when optical axes of laser 702, beam expanding lens 704, collimator 706, diffractive optical element 708, and camera are mutually aligned, to enable the image sensor to capture an image of the light beams 722 for intrinsic calibration. In such examples, the diffractive optical element 708 may be further configured to cause a grid of points to be formed on the image sensor of the camera based on the projected light beams, with the grid of points corresponding to the view angles of the camera and enabling calculation of at least one intrinsic parameter (e.g., orientation of the diffractive optical element 708, focal length of the camera, principal point of the camera, distortion of the orientation of the camera). In some embodiments, each point of the grid of points appears to originate from an infinite distance from the camera, to emulate a calibration "target" similar to a use case of cameras 202a of autonomous vehicle 102.

Figure 8:
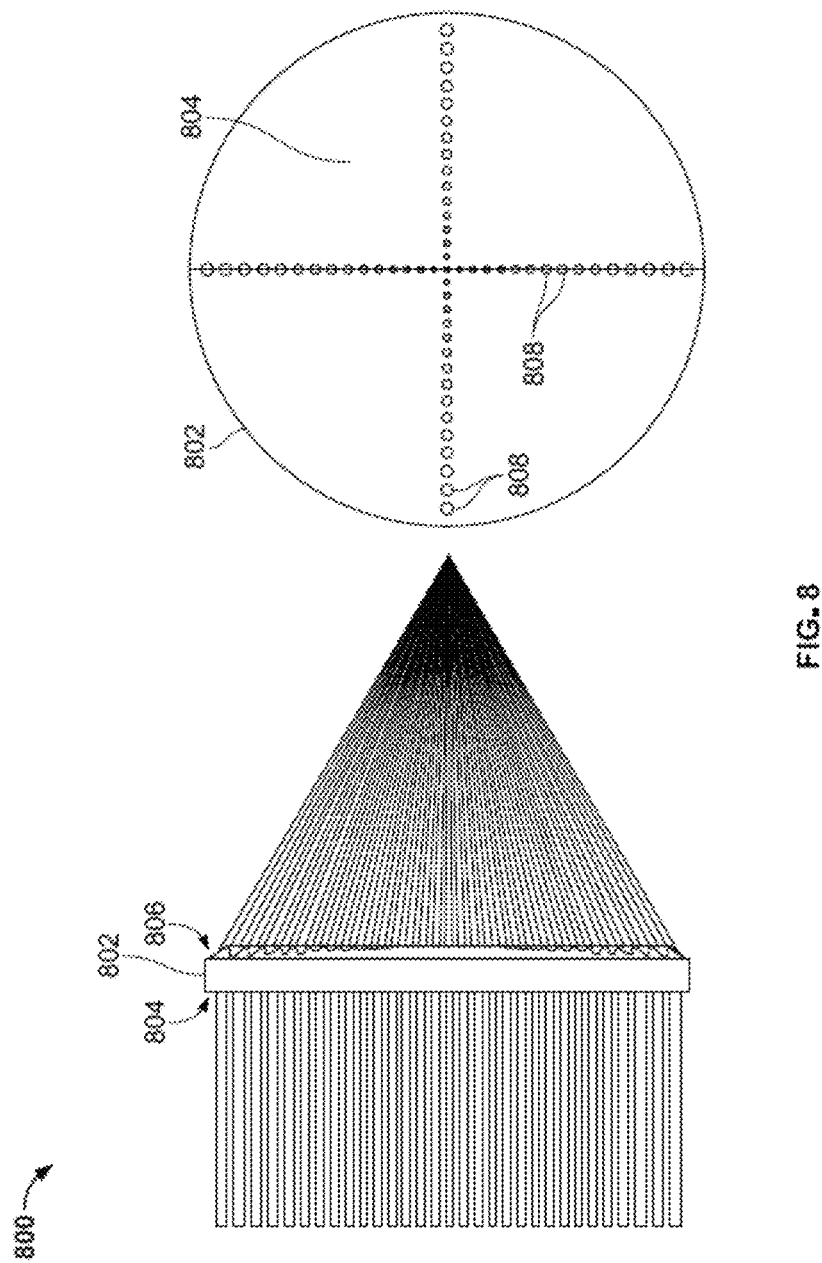
FIGS. 8 and 9 are diagrams of implementations of diffractive optical elements for geometric intrinsic camera calibration.
Figure 9:
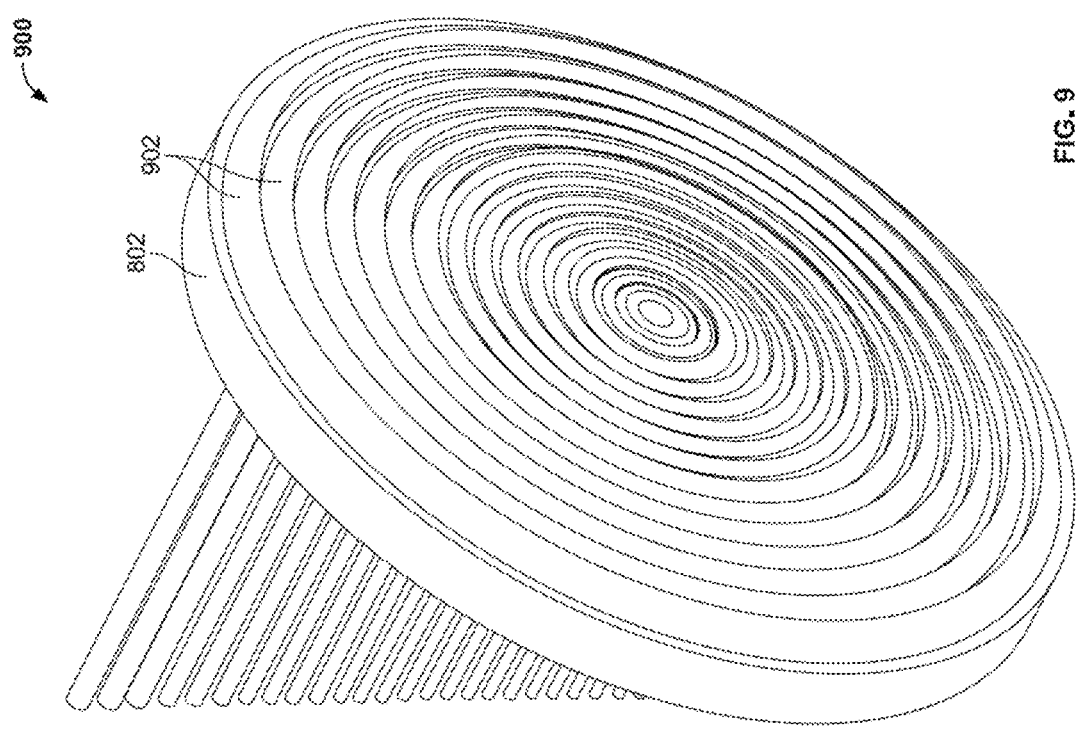

Referring now to FIGS. 8 and 9, illustrated are diagrams 800 and 900 of implementations of diffractive optical elements (which, for example, may be the same as, or similar to, diffractive optical element 708 or any other diffractive optical element(s) described herein). In some embodiments, as shown in FIG. 8, diffractive optical element 802 includes a first surface 804 and a second side 806. The first surface 804 includes apertures 808, which, in some embodiments, are arranged in a crosshair pattern. In one example, the apertures 808 are etched into a flat surface to form a mask on the first surface 804 of the diffractive optical element 802. In some examples, the diffractive optical element 802 and the apertures 808 are circular, and diameters of the apertures 808 decrease in a direction from an edge of the diffractive optical element 802 toward a center of the diffractive optical element 802. With continued reference to FIG. 8 and FIG. 9, in some examples, diffractive optical element 802 includes ridges 902 that are arranged in concentric circles on the second surface 806 of the diffractive optical element 802. In such examples, the apertures 808 are arranged along optical paths of the ridges 902.

Figure 10:
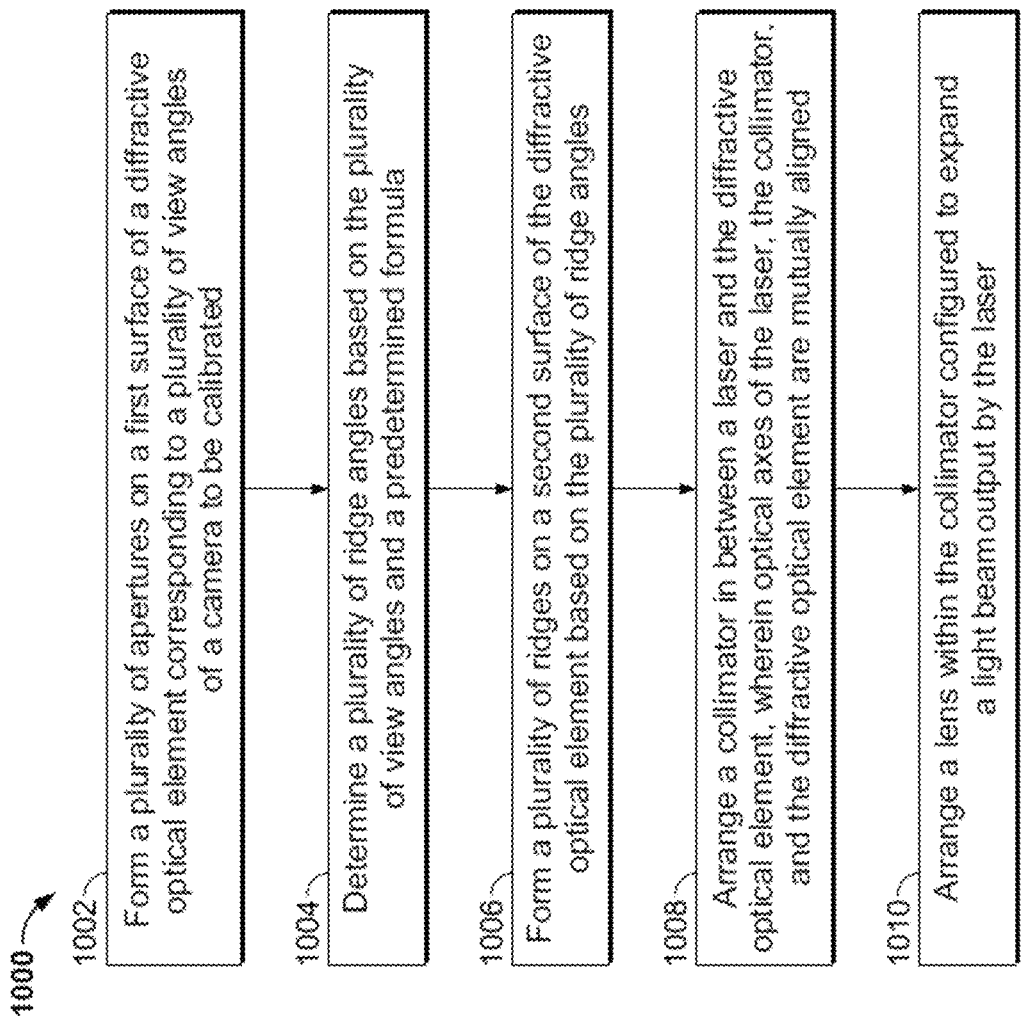
FIG. 10 is a flowchart of a process for manufacturing a geometric intrinsic camera calibration system including a diffractive optical element.

Referring now to FIG. 10, illustrated is a flowchart of a process 1000 for manufacturing a geometric intrinsic camera calibration system including a diffractive optical element. In some embodiments, one or more of the steps described with respect to process 1000 are performed (e.g., completely, partially, and/or the like) by autonomous vehicle 102, as above. Additionally or alternatively, in some embodiments one or more steps described with respect to process 1000 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 10, apertures are formed on a first surface of a diffractive optical element corresponding to a plurality of view angles of a camera to be calibrated (block 1002). Processor 608 (or any other suitable processor) determines ridge angles based on the view angles and based on a predetermined formula (e.g., Snell's law) (block 1004), as described in further detail in connection with FIG. 11. Ridges are formed on a second surface of the diffractive optical element based on the ridge angles (block 1006). A collimator is arranged in between a laser and the diffractive optical element, with optical axes of the laser, the collimator, and the diffractive optical element being mutually aligned (block 1008). Arranging the collimator in between the laser and the diffractive optical element, in some examples, includes fixing a distance from the laser to the collimator and fixing a distance from the collimator to the diffractive optical element. In some examples, a lens is arranged within the collimator and is configured to expand a light beam output by the laser (block 1010).

Figure 11:
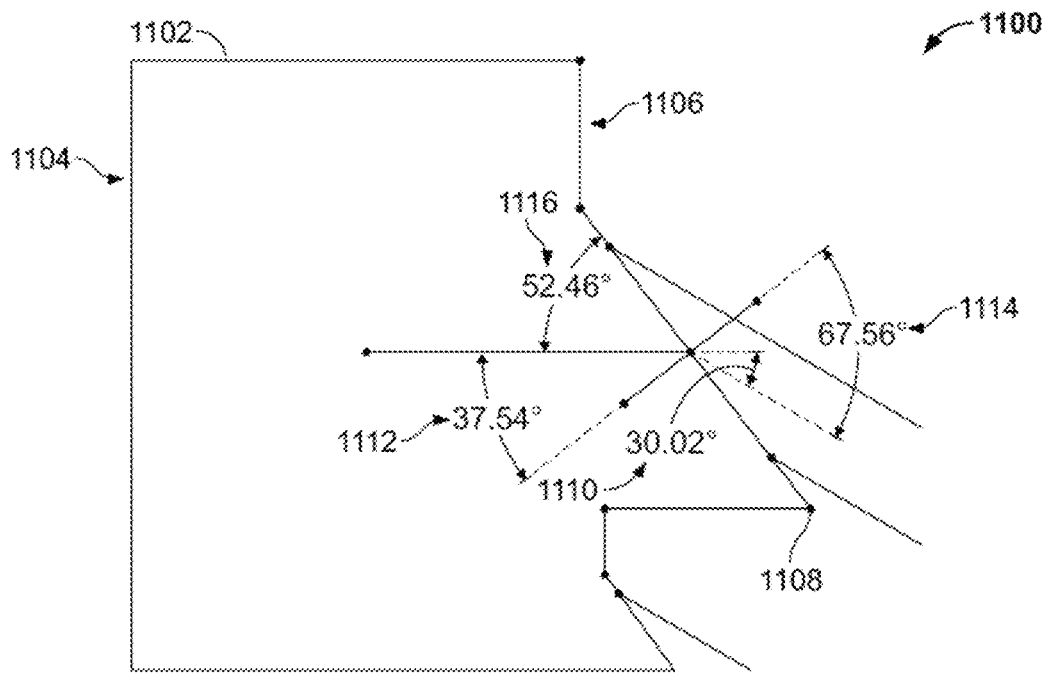
FIG. 11 is a further diagram of an implementation of a diffractive optical elements for geometric intrinsic camera calibration.

Referring now to FIG. 11, illustrated is a diagram 1100 of an implementation of a diffractive optical element 1102 (which, for example, may be the same as, or similar to, diffractive optical element 708 or any other diffractive optical element(s) described herein). Diffractive optical element 1102 includes a first surface 1104 (which, for example, may be the same as, or similar to, first surface 718 and/or 804) and a second surface 1106 (which, for example, may be the same as, or similar to, second surface 720 and/or 806). FIG. 11 includes a partial cross-sectional view of a single ridge 1108 of diffractive optical element 1102 having a ridge angle 1116 (also referred to as a DOE surface angle), a view angle 1110, a theta1 1112, and a theta2 1114. In some embodiments, diffractive optical element 1102 includes multiple (e.g., 15) view angles, and multiple (e.g., 15) corresponding ridges (e.g., similar to ridge 1108). In such embodiments, the geometry (e.g., angles) of each ridge is determined based on Snell's law, a refractive index of material forming the diffractive optical element, and/or other factors, to achieve a desired field angle projection into a camera lens to be calibrated. For instance, the ridge angles (e.g., ridge angle 1116), in some examples are determined by identifying the ridge angles configured to deflect collimated beams from a collimator toward a camera-under-test at particular view angles (e.g., view angles 1110). According to one example, Snell's law (reproduced herein as Equation (1)) and Equation (2) are utilized in an iterative manner, determining values of theta2 (1114) based on successively inputted estimates of theta1 (1112) until values of theta1 and theta2 that result in the desired view angle (1110) are determined.

$$N1 \times \sin(\text{theta1}) = N2 \times \sin(\text{theta2}) \quad \text{Equation (1)}$$

$$\text{view angle} = \text{theta2} - (90° - \text{theta1}) \quad \text{Equation (2)}$$

Once the values of theta1 and theta2 that result in the desired view angle (1110) are determined, the respective ridge angle (1116) for the desired view angle is determined according to Equation (3).

$$\text{ridge angle} = 90° - \text{theta1} \quad \text{Equation (3)}$$

Table 1118 shows an example list of view angles 1110, corresponding values of N1 and N2 (refractive indices of material forming diffractive optical element 1102 and a vacuum, respectively), and values of theta1 1112, theta2 1114, and ridge angles 1116 that may be determined for an example diffractive optical element 1102 having 15 view angles.

Figure 12:
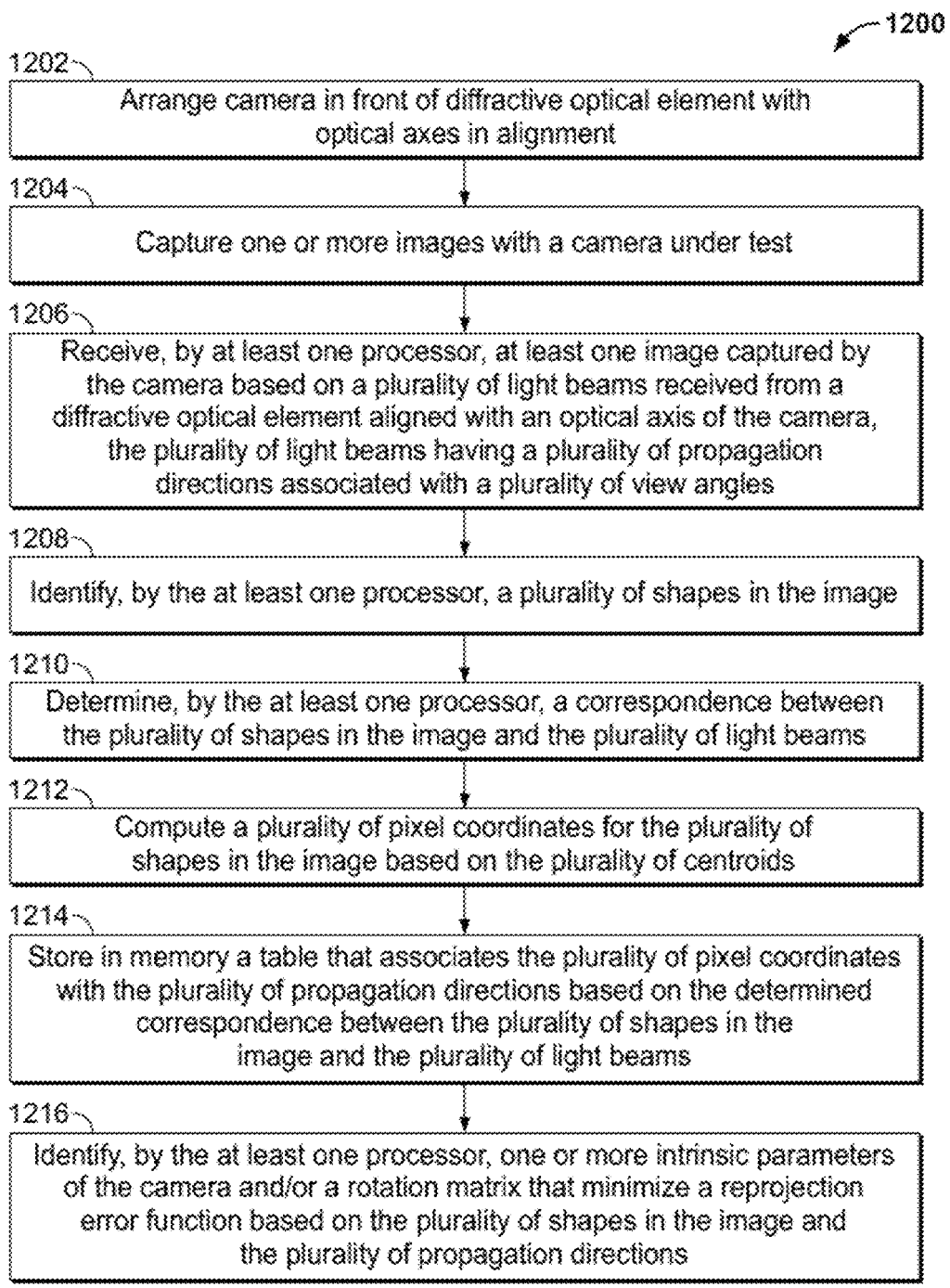
FIG. 12 is a flowchart of a process for geometric intrinsic camera calibration using a diffractive optical element.

Referring now to FIG. 12, illustrated is a flowchart of a process 1200 for geometric intrinsic camera calibration using a diffractive optical element. In some embodiments, one or more of the steps described with respect to process 1200 are performed (e.g., completely, partially, and/or the like) by autonomous vehicle 102, as above. Additionally or alternatively, in some embodiments one or more steps described with respect to process 1200 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 12, a camera (e.g., camera 202a) is arranged in front of a diffractive optical element (which, for example, may be the same as, or similar to, diffractive optical element 708 or any other diffractive optical element(s) described herein) with mutual alignment of optical axes (block 1202). Light beams are projected upon the camera via the diffractive optical element in the manner described elsewhere herein, and the camera captures one or more images based on the projected light beams (block 1204). Processor 608 (or any suitable processor) receives at least one image captured by the camera based on the light beams received from the diffractive optical element aligned with the optical axis of the camera, the light beams having propagation directions associated with view angles of the camera (block 1206). In an example, the directions of the light beams include coordinates in a coordinate frame of the diffractive optical element. Processor 608 identifies shapes in the image, for example, in the manner described in further detail below in connection with FIG. 13 (block 1208). Processor 608 determines a correspondence between the shapes in the image and the light beams, for example, in the manner described in further detail below in connection with FIG. 13. In one example, determining the correspondence between the shapes in the image and the light beams includes generating a list (e.g., pU1, DA1), (pU2, DA2), . . . , (pUN, DAN) where the pUi represent pixel coordinates of dots in the image, and DAi represent corresponding directions of the light beams in DOE-centric coordinates. (block 1210). The pixel coordinates of the dots in the image, for example, may be computed based on a centroid detection algorithm. (block 1212). Processor 608 stores in memory (e.g., memory 612) a table that associates the pixel coordinates with the propagation directions based on the determined correspondence between the shapes in the image and the light beams. (block 1214). Processor 608 identifies one or more intrinsic parameters of the camera (e.g., a focal length of the camera, a principal point of the camera, and/or a distortion of a lens of the camera) that minimize a reprojection error function based on the shapes in the image and the propagation directions (e.g., finding intrinsic parameters ($\Theta$) and the rotation matrix CRD that minimize a reprojection error function, such as the sum-of-squares reprojection error function shown in equation (4)) where $\|.\|$ represents the 2-norm) (block 1216).

$$Q(\Theta, _C R_D) = \sum_{i=1}^{N} \|_P U_i - f(_C R_D \cdot _D A_i, \Theta)\|^2. \quad \text{Equation (4)}$$

Figure 13:
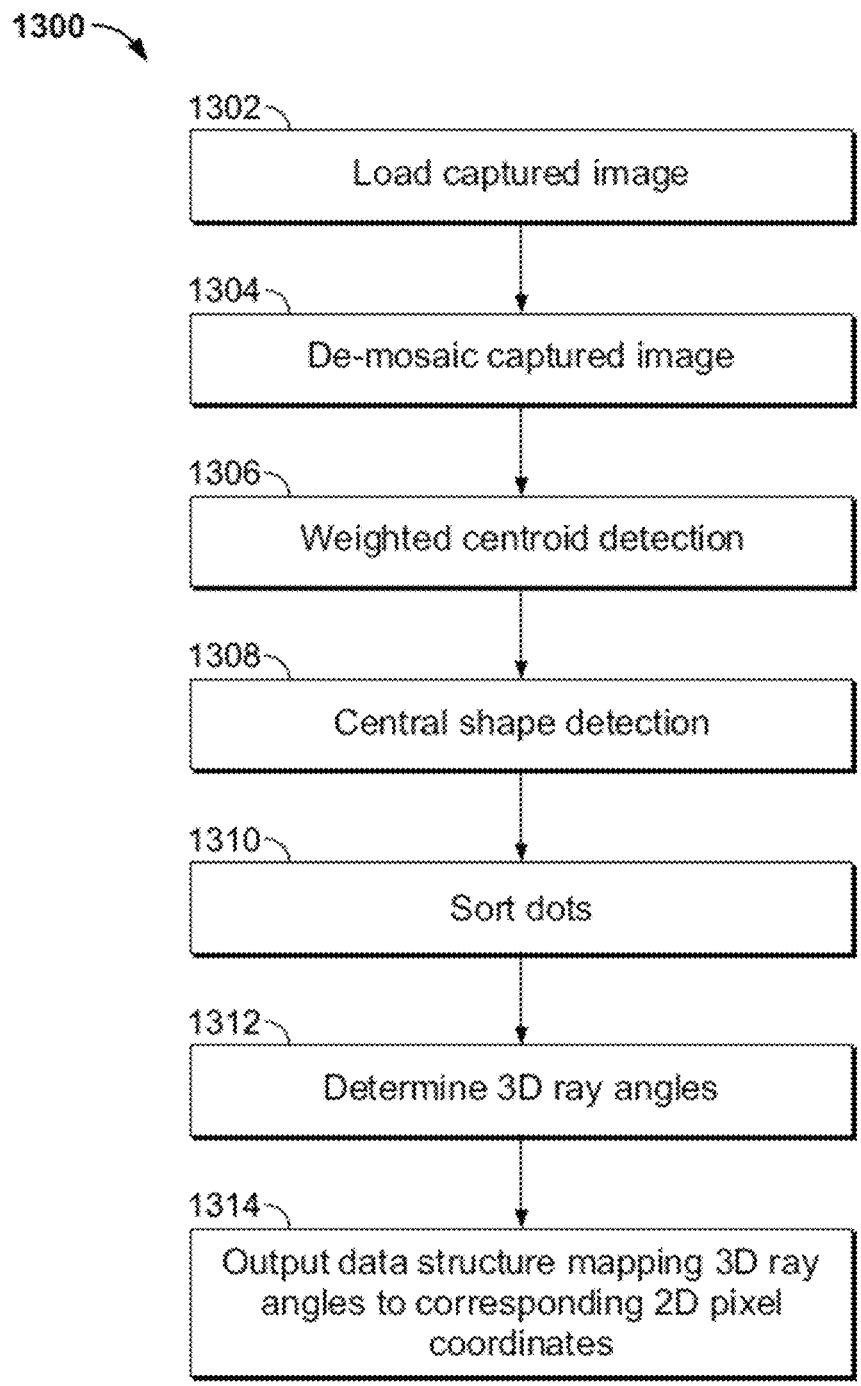
FIG. 13 is a flowchart of a further process for geometric intrinsic camera calibration using a diffractive optical element.

Referring now to FIG. 13, illustrated is a flowchart of a further process 1300 for geometric intrinsic camera calibration using a diffractive optical element. In some embodiments, process 1300 is the same as or similar to the processes of blocks 1208, 1210, and/or 1212 described above in connection with FIG. 12. In some embodiments, one or more of the steps described with respect to process 1300 are performed (e.g., completely, partially, and/or the like) by autonomous vehicle 102, as above. Additionally or alternatively, in some embodiments one or more steps described with respect to process 1300 may be performed (e.g., completely, partially, and/or the like) by another device or group of devices separate from or including autonomous vehicle 102, such as processor 608, a remote server (e.g., a remote server that is the same as or similar to remote AV system 114 and/or fleet management system 116 of FIG. 1) carrying out some or all of the above calculations.

Figure 14:
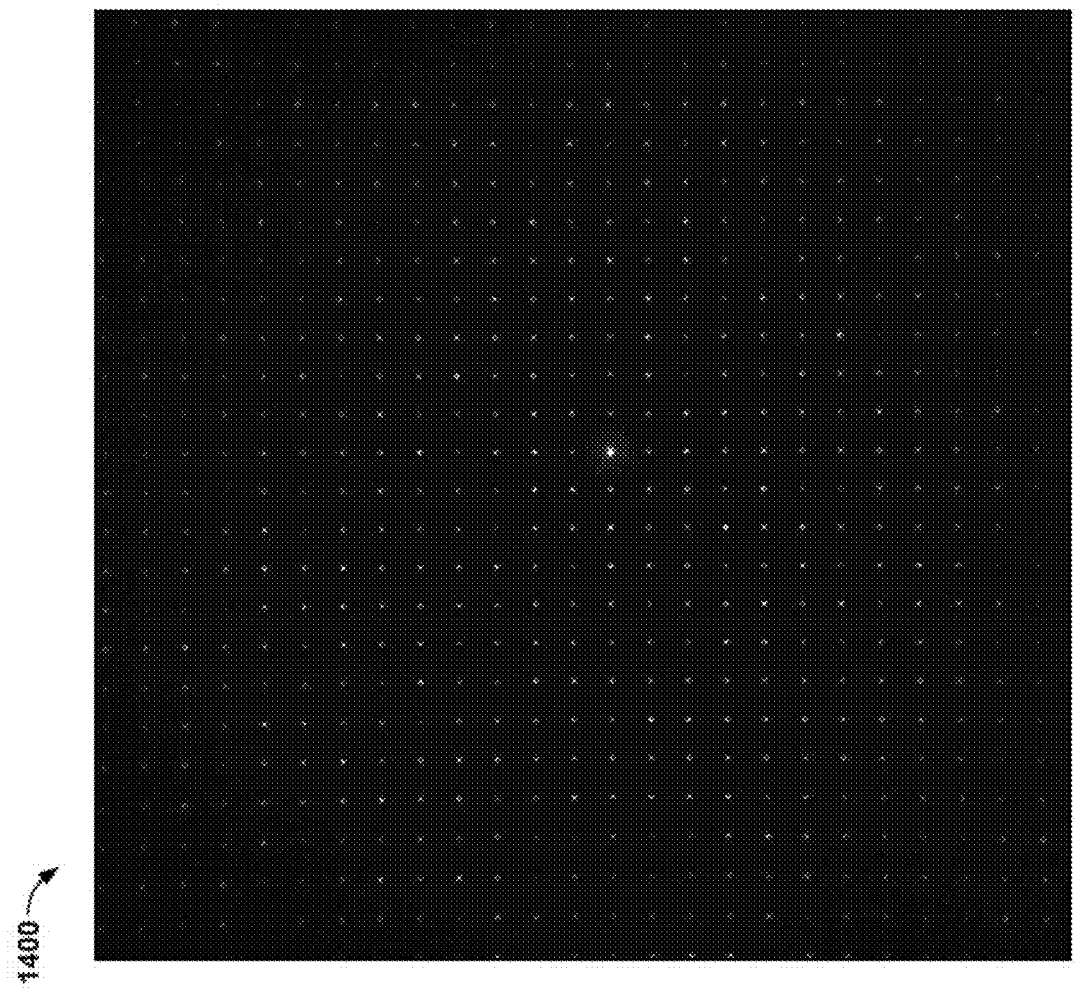
FIG. 14 is a diagram showing an example image captured as part of a process for geometric intrinsic camera calibration using a diffractive optical element.
Figure 15:
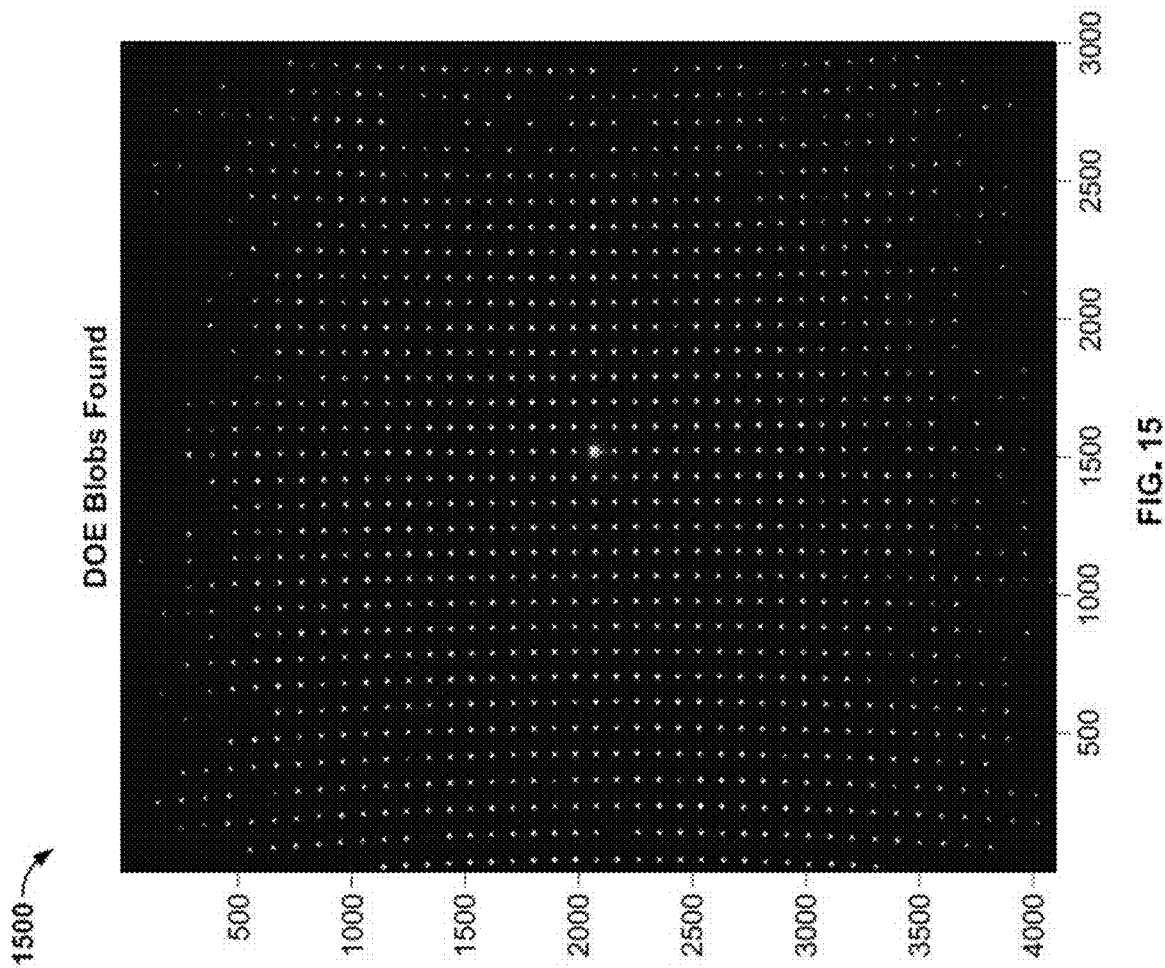
FIG. 15 is a diagram showing shapes identified in the sample image of FIG. 14 as part of a process for geometric intrinsic camera calibration using a diffractive optical element.
Figure 16:
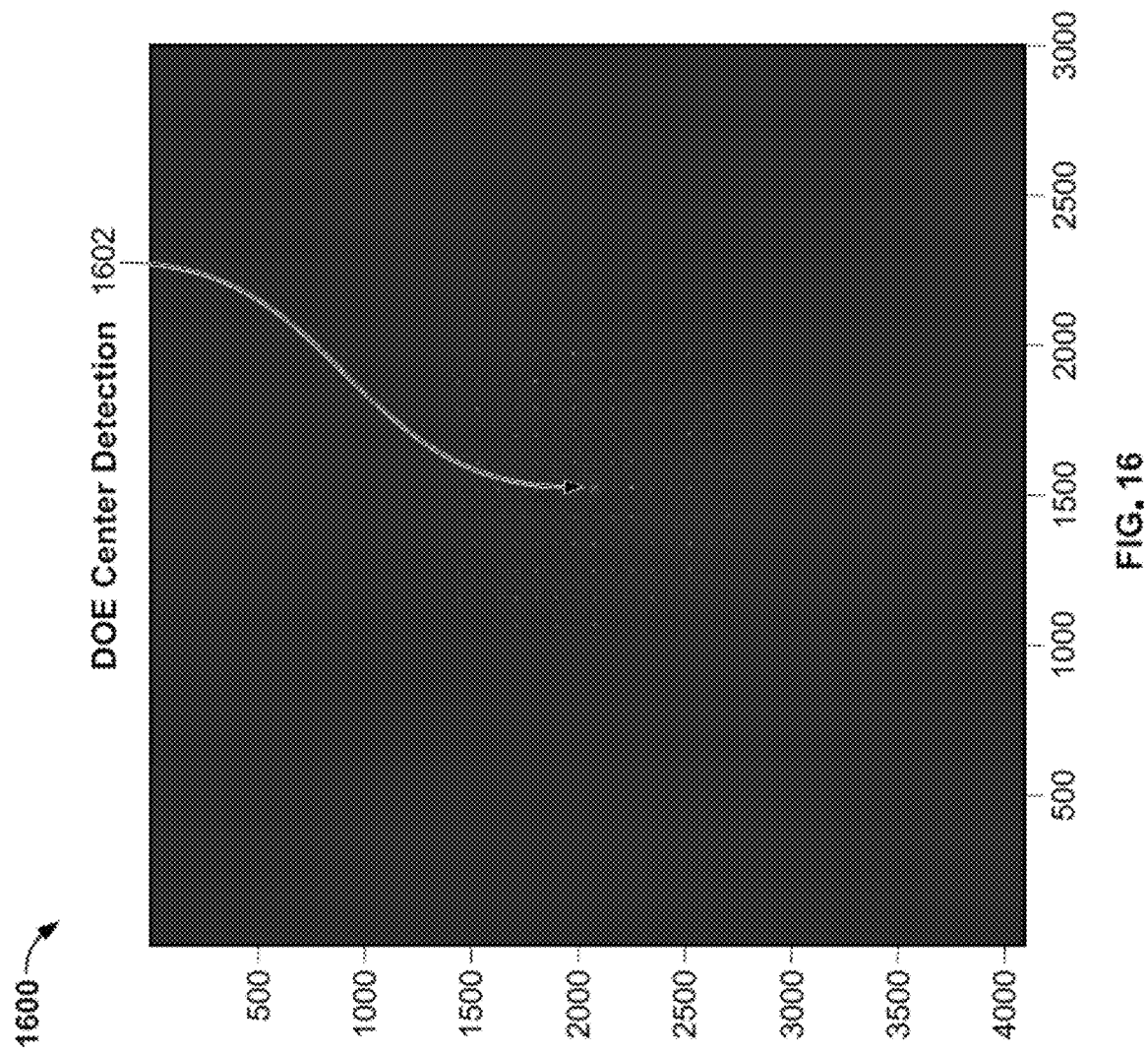
FIG. 16 is a diagram showing a central shape identified in the image of FIG. 15 as part of a process for geometric intrinsic camera calibration using a diffractive optical element.
Figure 17:
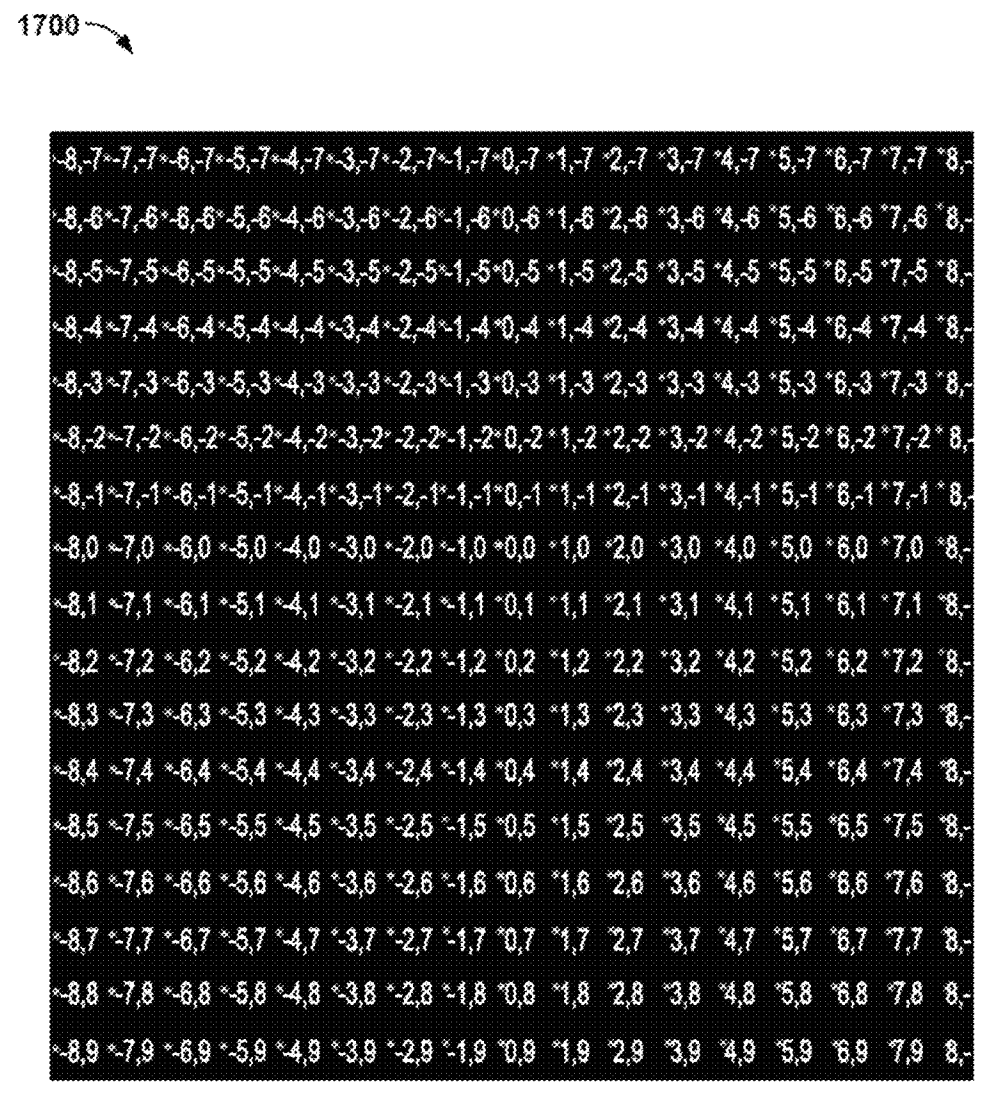

With continued reference to FIG. 13, processor 608 (or any suitable processor) loads an image, such as the image 1400 in FIG. 14 that was captured by a camera (e.g., camera 202*a*) based on light beams projected thereupon by way of a diffractive optical element (which, for example, may be the same as, or similar to, diffractive optical element 708 or any other diffractive optical element(s) described herein) (1302). Processor 608 de-mosaics the loaded image using any suitable de-mosaic algorithm (1304). Processor 608 identifies shapes (e.g., blobs, dots, and/or centroids as shown in image 1500 of FIG. 15) in the de-mosaiced image by executing a weighted centroid detection algorithm based on the de-mosaiced image (1306). Processor 608 designates one of the identified shapes (e.g., shape 1602 of FIG. 16) as corresponding to a central shape 1602 from among the shapes in image 1500 (1308). Processor 608 sorts the shapes of image 1500 into an order (e.g., in the row and column order indexed based on the central shape 1602 shown in FIG. 17) based at least in part on positions of the plurality of shapes with respect to the central shape 1602 (1310). Processor 608 associates each shape with a corresponding light beam from among the light beams based at least in part on the order of the shapes (1312).

The DOE intrinsic calibration modules described with reference to FIGS. 6-17 can be used to determine the intrinsic properties of the camera system both with and without a window installed. These intrinsic properties can then be compared to determine the effects of boresight shift caused by the window. A transformation that corrects for the boresight sight can also be determined and applied to future images captured with the window installed to correct for the boresight shift.

Figure 18:
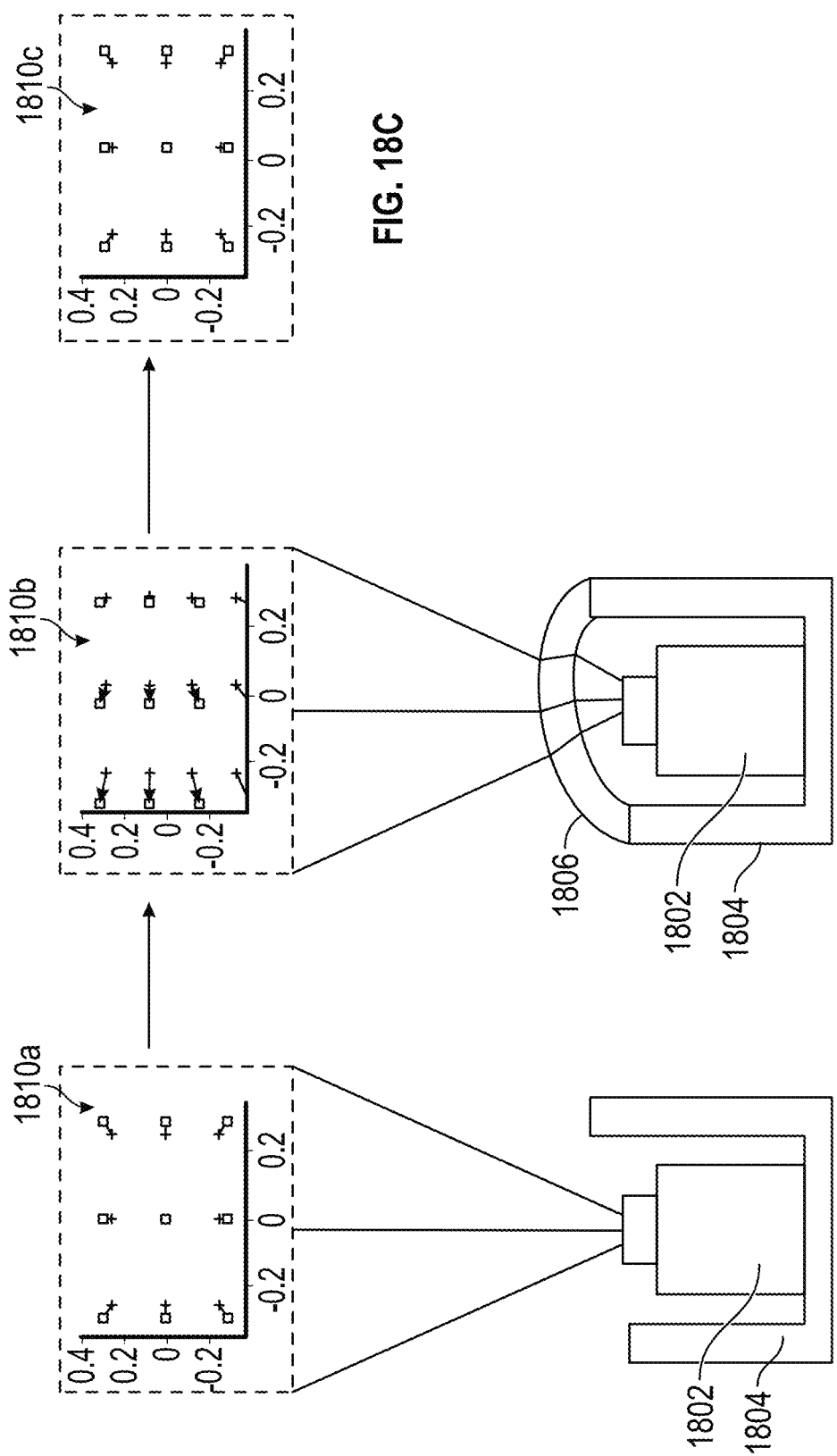
FIGS. 18A, 18B, and 18C illustrate different stages in determination and correction of boresight shift.

FIGS. 18A-18C are illustrative of an example process. With reference to FIG. 18A, a camera assembly 1802 can be installed in a housing 1804. Without a protective window installed, an intrinsic calibration can be performed (for example, as described above with reference to FIGS. 6-17) to determine, for a grid of pixels, the direction that the pixels point. In FIG. 18A, the directions that the pixels point are represented in plot 1810*a*, with pixels pointing from the plus sign to the square.

The size of the grid and how close the points of the grid should be together (e.g., the pixel pitch) of the diffractive optical element (DOE) can be, in some embodiments, determined based on the optical system (e.g., the camera) that is going to be calibrated. Factors of the optical system that can be considered include: (a) The FOV of the camera. In some embodiments it is desirable to cover the camera's entire field of view such that you see the DOE points encompassing the full FOV; (b) The grid size can be based on how many points in a particular camera's FOV to successfully calibrate the system using the intrinsic calibration algorithm. For example, a 15 by 15 grid might be enough for a smaller FOV of 30-40 degrees, but for a 90+ degree FOV camera, the 15×15 grid might be spread apart too much to cover the entire FOV. In that case, it may be desirable to increase the grid size; (c) The pixel pitch. This can depend on the sensor resolution and/or FOV and the calibration algorithm's capability at hand. For example, if the camera has high resolution, moderate FOV (e.g., about 50 degrees), and a robust calibration algorithm is used, the pixel could be somewhere about 3-4 microns provided the grids cover the entire FOV. In general, the more number of points cover the FOV, the more data points the calibration algorithm can utilize for its optimization, thereby providing more accurate algorithm provided sensor resolution doesn't hinder it's performance.

As shown in FIG. 18B, a window 1806 can then be installed on the housing 1804 over the camera assembly 1802. With the window 1806 installed, the intrinsic calibration can be performed again. For the grid of pixels, the directions are once again determined. These directions are represented by the plot 1810*b*. As shown, by comparing plot 1810*a* and plot 1801*b*, the effects of the boresight shift can be seen in the differences between the plots. By computing the angular difference between each of the directions for each of the pixels, a transformation between the two can be obtained. When applied, the transformation can correct the boresight shift as shown in FIG. 18C. As shown, even with the window 1806 installed, when the transformation is applied, plot 1810*c* appears similar or identical to the plot 1810*a* which represents the system without the boresight shift caused by the window 1806.

Figure 19:
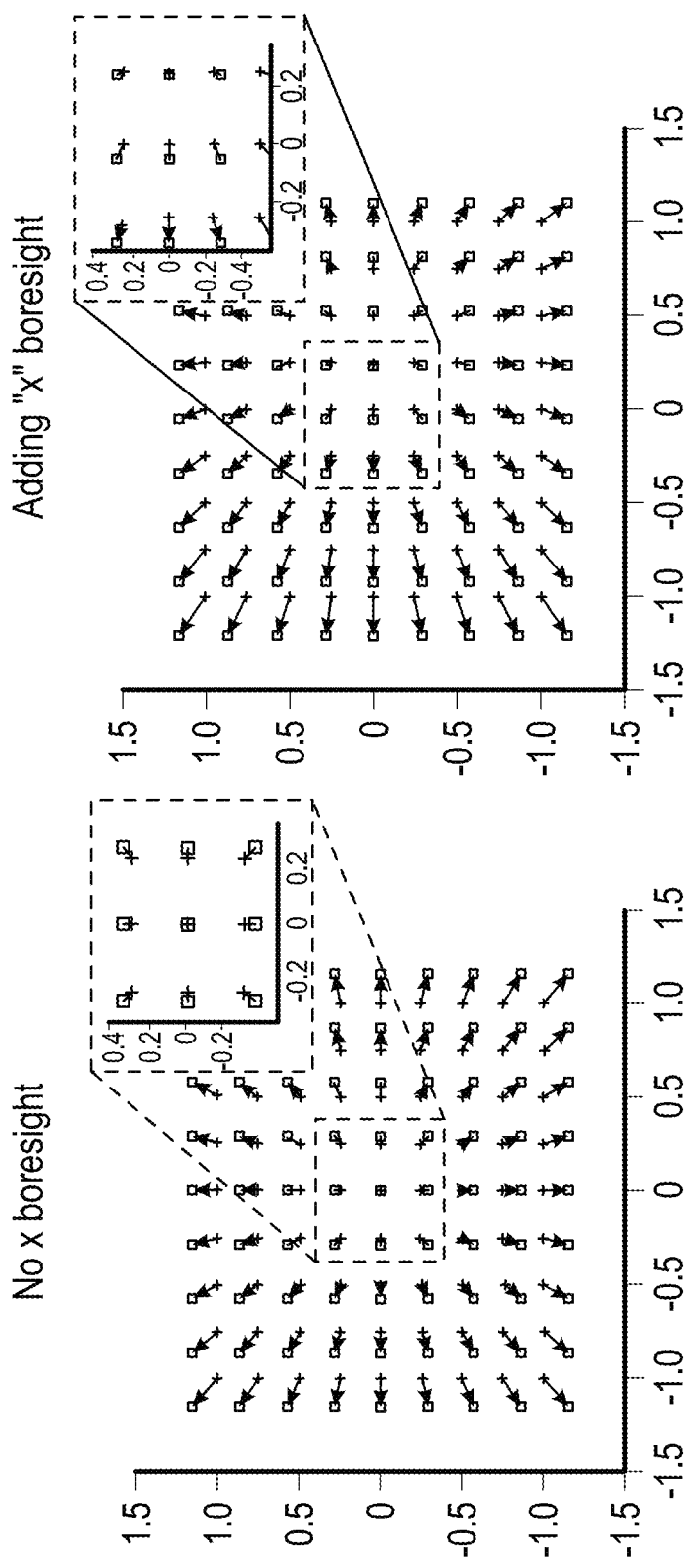
FIGS. 19A and 19B illustrate plots of pixel directions determined with and without a window installed over the camera assembly.

FIGS. 19A and 19B illustrate the effect using a larger grid of pixels. FIG. 19A represents a plot of pixel directions obtained through intrinsic calibration prior to installation of the window, and FIG. 19B illustrates a plot of pixel directions obtained through intrinsic calibration after installation of the window. As shown, pixel directions have changed in FIG. 19B. This change is caused by the boresight shift. By computing the angular difference between the pixel directions for each pixel in the grid, the correcting transformation can be obtained.

Figure 20:
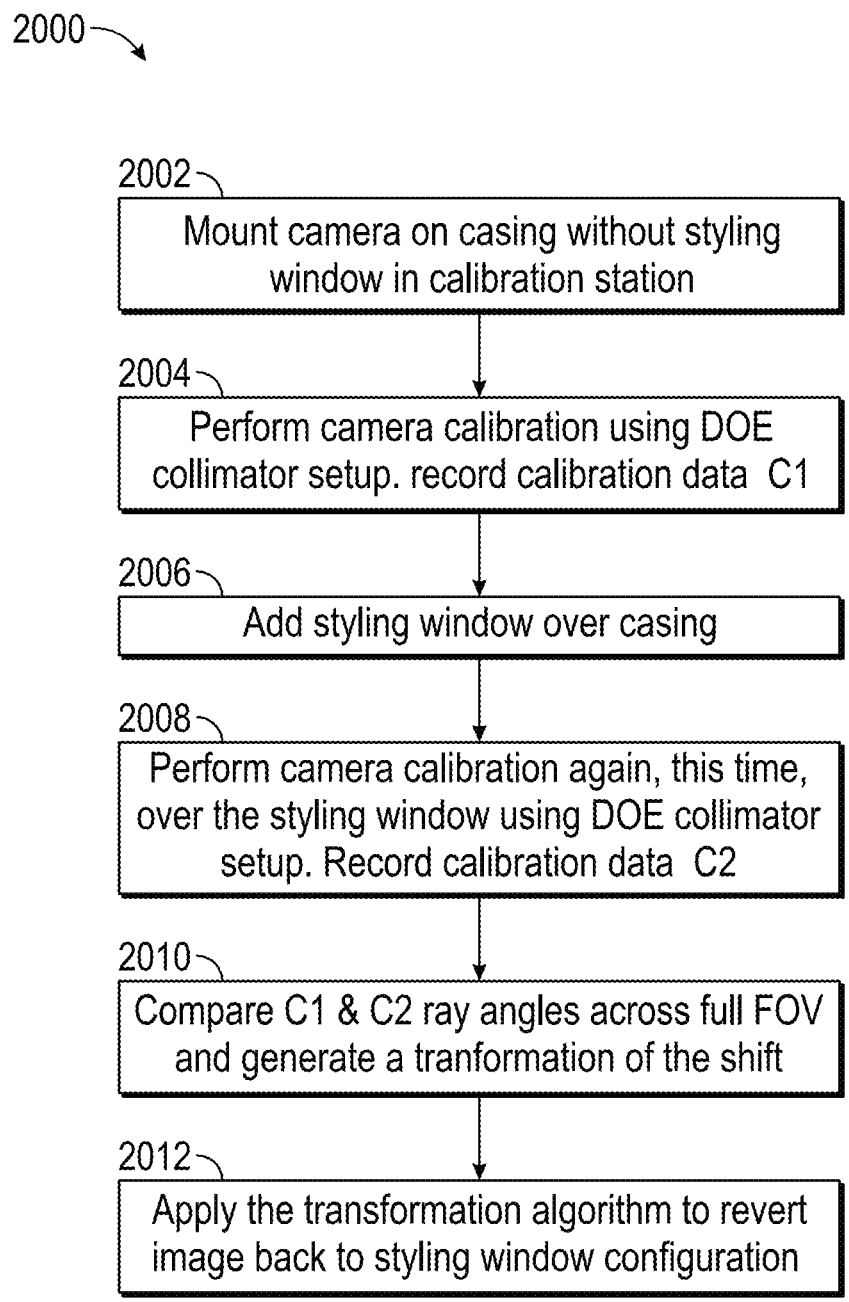
FIG. 20 illustrates an embodiment of process for determining and correcting for boresight shift.

FIG. 20 is a flowchart illustrating an example process 2000 for determining a transformation that can correct for boresight shift. The process begins at block 2002 by mounting a camera assembly in a casing or housing without installation of a window over the camera assembly. At block 2004, the camera is calibrated without the window installed. The calibration can include the intrinsic calibration using a DOE intrinsic calibration module as described above with reference to FIGS. 6-17. The calibration can determine, for example, a pixel direction (e.g., three-dimensional ray directions) for a plurality of points in a grid. The number of pixels and the size of the grid can be configured to cover the field of view of the camera assembly. This information can be stored as calibration data C1.

Moving to block 2006, the window can then be installed over the camera assembly. With the window installed, at block 2008, the camera is calibrated for a second time. The calibration can include the intrinsic calibration using a DOE intrinsic calibration module as described above with reference to FIGS. 6-17. The calibration can determine, for example, the pixel direction (e.g., three-dimensional ray directions) for the plurality of points in a grid. This information can be stored as calibration data C2.

At block 2010, calibration data C1 (without the window) and calibration data C2 are compared to determine the angular difference between the pixel directions for each pixel in the grid. These differences are caused by the boresight shift and can be used to determine a transformation that corrects to the boresight shift. In some embodiments, the transform is a comparison between the ray angles between the ray directions of a particular point in the FOV with and without the styling window/optical layer. This ray angles difference exists for every grid point in 3D space. In some embodiments, an extrinsic calibration between the two grid "planes" provides a rotation and translation matrix.

At block 2012, the transformation can be applied to each subsequent images captured by the camera to correct for the boresight shift.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Various additional example embodiments of the disclosure can be described by the following clauses:

Clause 1: A method, comprising:
  positioning a camera assembly in a housing, the camera assembly comprising a lens assembly and an image sensor, the housing positioned relative to a target such that the calibration target at least partially covers a field of view of the camera assembly;
  based on a first output of the image sensor, determining a first plurality of pixel locations corresponding to a plurality of locations on the target;
  based on a second output of the image sensor obtained with a window positioned on the housing, determining a second plurality of pixel locations corresponding to the plurality of locations on the target, wherein a boresight shift caused by the window causes the second plurality of pixel locations to differ from the first plurality of pixel locations;
  generating a transformation that maps the second plurality of pixel locations to the first plurality of pixel locations; and
  applying the transformation to subsequent images captured by the camera assembly with the window installed over the camera assembly.

Clause 2: The method of Clause 1, wherein the transformation corrects for the boresight shift caused by the window.

Clause 3: The method of any of Clauses 1 or 2, wherein:
  determining the first plurality of pixel locations corresponding to the plurality of locations on the target comprises, for each of the first plurality of pixel locations, determining a first three-dimensional ray direction from the pixel location to the corresponding location on the target; and
  determining the second plurality of pixel locations corresponding to the plurality of locations on the target comprises, for each of the second plurality of pixel locations, determining a second three-dimensional ray direction from the pixel location to the corresponding location on the target.

Clause 4: The method of Clause 3, wherein generating the transformation comprises determining an angular difference between each of the first and second three-dimensional ray directions.

Clause 5: The method of any of Clauses 1-4, wherein the target comprises a grid of points.

Clause 6: The method of any of Clauses 1-5, wherein the housing is positioned relative to the target such that the target fully covers the field of view of the camera sensor.

Clause 7: The method of any of Clauses 1-6, further comprising storing the transformation.

Clause 8: At least one non-transitory storage media storing instructions that, when executed by at least one processor, cause the at least one processor to:
  determine, based on a first output of a camera assembly, a first plurality of pixel locations corresponding to a plurality of locations on a target, wherein the first output of the camera assembly is obtained prior to positioning a window over the camera assembly;
  determine, based on a second output of the camera assembly obtained with the window positioned over the camera assembly, a second plurality of pixel locations corresponding to the plurality of locations on the target;
  generate a transformation that maps the second plurality of pixel locations to the first plurality of pixel locations; and
  store the transformation in a memory associated with the camera assembly such that the transformation is applied to subsequent images captured by the camera assembly with the window installed over the camera assembly.

Clause 9: The at least one non-transitory storage media of Clause 8, wherein the transformation corrects for the boresight shift caused by the window.

Clause 10: The at least one non-transitory storage media of any of Clauses 8 or 9, wherein the instructions further cause the at least one processor to:
- determine the first plurality of pixel locations corresponding to the plurality of locations on the target by, for each of the first plurality of pixel locations, determining a first three-dimensional ray direction from the pixel location to the corresponding location on the target; and
- determine the second plurality of pixel locations corresponding to the plurality of locations on the target by, for each of the second plurality of pixel locations, determining a second three-dimensional ray direction from the pixel location to the corresponding location on the target.

Clause 11: The at least one non-transitory storage media of Clause 10, wherein generating the transformation comprises determining an angular difference between each of the first and second three-dimensional ray directions.

Clause 12: The at least one non-transitory storage media of any of Clauses 8-11, wherein the target comprises a grid of points.

Clause 13: The at least one non-transitory storage media of any of Claims 8-12, wherein the instructions further cause the at least one processor to store the transformation.

Clause 14: A system, comprising:
- a camera assembly comprising a lens assembly and an image sensor positioned within a housing;
- a computer readable medium storing a transformation that corrects for a boresight shift caused by the window, wherein the transformation is generated by:
  - determining, based on a first output of the camera assembly, a first plurality of pixel locations corresponding to a plurality of locations on a target, wherein the first output of the camera assembly is obtained prior to positioning a window over the camera assembly,
  - determining, based on a second output of the camera assembly obtained with the window positioned over the camera assembly, a second plurality of pixel locations corresponding to the plurality of locations on the target, and
  - mapping the second plurality of pixel locations to the first plurality of pixel locations; and
- a processor configured to apply the transformation to images captured by the camera assembly.

Clause 15: The system of Clause 14, wherein:
- determining the first plurality of pixel locations corresponding to the plurality of locations on the target comprises, for each of the first plurality of pixel locations, determining a first three-dimensional ray direction from the pixel location to the corresponding location on the target; and
- determining the second plurality of pixel locations corresponding to the plurality of locations on the target comprises, for each of the second plurality of pixel locations, determining a second three-dimensional ray direction from the pixel location to the corresponding location on the target.

Clause 16: The system of Clause 15, wherein the transformation is generated by determining an angular difference between each of the first and second three-dimensional ray directions.

Clause 17: The system of any of Clauses 14-16, wherein the target comprises a grid of points.

Clause 18: The system of any of Clauses 14-17, wherein the window is a protective window.

Clause 19: The system of any of Clauses 14-18, wherein the window seals the camera assembly.

Clause 20: The system of any of Clauses 14-19, wherein the housing is positioned on an autonomous system of a vehicle.

What is claimed is:

1. A method, comprising:
   positioning a camera assembly in a housing, the camera assembly comprising a lens assembly and an image sensor, the housing positioned relative to an intrinsic camera calibration system comprising a diffractive optical element configured to project a grid of points such that the grid of points at least partially covers a field of view of the camera assembly;
   based on a first output of the image sensor, determining a first plurality of pixel locations corresponding to each of the grid of points;
   based on a second output of the image sensor obtained with a window positioned on the housing, determining a second plurality of pixel locations corresponding to each of the grid of points, wherein a boresight shift caused by the window causes the second plurality of pixel locations to differ from the first plurality of pixel locations;
   generating a transformation that maps the second plurality of pixel locations to the first plurality of pixel locations; and
   applying the transformation to subsequent images captured by the camera assembly with the window installed over the camera assembly.

2. The method of claim 1, wherein the transformation corrects for the boresight shift caused by the window.

3. The method of claim 1, wherein:
   determining the first plurality of pixel locations corresponding to the grid of points comprises, for each of the first plurality of pixel locations, determining a first three-dimensional ray direction from the pixel location to the corresponding point of the grid of points; and
   determining the second plurality of pixel locations corresponding to the grid of points comprises, for each of the second plurality of pixel locations, determining a second three-dimensional ray direction from the pixel location to the corresponding point of the grid of points.

4. The method of claim 3, wherein generating the transformation comprises determining an angular difference between each of the first and second three-dimensional ray directions.

5. The method of claim 4, wherein the grid of points is formed by beams of light projected by the intrinsic camera calibration system.

6. The method of claim 1, wherein the housing is positioned relative to the intrinsic camera calibration system such that the grid of points fully covers the field of view of the camera sensor.

7. The method of claim 1, further comprising storing the transformation.

8. At least one non-transitory storage media storing instructions that, when executed by at least one processor, cause the at least one processor to:
   determine, based on a first output of a camera assembly, a first plurality of pixel locations corresponding to a grid of points projected onto an image sensor of the camera assembly by an intrinsic camera calibration system comprising a diffractive optical element, wherein the first output of the camera assembly is obtained prior to positioning a window over the camera assembly;

determine, based on a second output of the camera assembly obtained with the window positioned over the camera assembly, a second plurality of pixel locations corresponding to the grid of points;

generate a transformation that maps the second plurality of pixel locations to the first plurality of pixel locations; and store the transformation in a memory associated with the camera assembly such that the transformation is applied to subsequent images captured by the camera assembly with the window installed over the camera assembly.

9. The at least one non-transitory storage media of claim 8, wherein the transformation corrects for boresight shift caused by the window.

10. The at least one non-transitory storage media of claim 8, wherein the instructions further cause the at least one processor to:

determine the first plurality of pixel locations corresponding to the grid of points by, for each of the first plurality of pixel locations, determining a first three-dimensional ray direction from the pixel location to the corresponding point of the grid of points; and determine the second plurality of pixel locations corresponding to the grid of points by, for each of the second plurality of pixel locations, determining a second three-dimensional ray direction from the pixel location to the corresponding point of the grid of points.

11. The at least one non-transitory storage media of claim 10, wherein generating the transformation comprises determining an angular difference between each of the first and second three-dimensional ray directions.

12. The at least one non-transitory storage media of claim 8, wherein the intrinsic camera calibration system projects beams of light to cause the grid of points.

13. The at least one non-transitory storage media of claim 8, wherein the instructions further cause the at least one processor to store the transformation.

14. A system, comprising:

a camera assembly comprising a lens assembly and an image sensor positioned within a housing;

a computer readable medium storing a transformation that corrects for a boresight shift caused by a window, wherein the transformation is generated by:

determining, based on a first output of the camera assembly, a first plurality of pixel locations corresponding to a grid of points projected onto the image sensor by an intrinsic camera calibration system comprising a diffractive optical element, wherein the first output of the camera assembly is obtained prior to positioning a window over the camera assembly, determining, based on a second output of the camera assembly obtained with the window positioned over the camera assembly, a second plurality of pixel locations corresponding to grid of points, and mapping the second plurality of pixel locations to the first plurality of pixel locations; and a processor configured to apply the transformation to images captured by the camera assembly.

15. The system of claim 14, wherein:

determining the first plurality of pixel locations corresponding to the grid of points comprises, for each of the first plurality of pixel locations, determining a first three-dimensional ray direction from the pixel location to the corresponding point of the grid of points; and determining the second plurality of pixel locations corresponding to the grid of points comprises, for each of the second plurality of pixel locations, determining a second three-dimensional ray direction from the pixel location to the corresponding point of the grid of points.

16. The system of claim 15, wherein the transformation is generated by determining an angular difference between each of the first and second three-dimensional ray directions.

17. The system of claim 14, wherein the intrinsic camera calibration system projects beams of light to cause grid of points.

18. The system of claim 14, wherein the window is a protective window.

19. The system of claim 14, wherein the window seals the camera assembly.

20. The system of claim 14, wherein the housing is positioned on an autonomous system of a vehicle.

* * * * *